United States Patent
Makar et al.

(10) Patent No.: US 8,949,377 B2
(45) Date of Patent: Feb. 3, 2015

(54) MANAGEMENT SYSTEM FOR A CONVERSATIONAL SYSTEM

(75) Inventors: Michael G. Makar, Boca Raton, FL (US); Joseph M. Mosley, Naples, FL (US); Tracy A. Tindall, Boca Raton, FL (US); Gene I. Kofman, Parkland, FL (US)

(73) Assignee: The DelFin Project, Inc., Boca Raton, FL (US)

( * ) Notice: Subject to any disclaimer, the term of this patent is extended or adjusted under 35 U.S.C. 154(b) by 336 days.

(21) Appl. No.: 13/084,060

(22) Filed: Apr. 11, 2011

(65) Prior Publication Data

US 2011/0213642 A1  Sep. 1, 2011

Related U.S. Application Data

(63) Continuation-in-part of application No. 12/124,531, filed on May 21, 2008, now Pat. No. 7,962,578.

(51) Int. Cl.
| | | |
|---|---|---|
| G06F 15/16 | (2006.01) | |
| G06F 17/27 | (2006.01) | |
| G06F 17/30 | (2006.01) | |
| G06N 99/00 | (2010.01) | |
| G06Q 10/06 | (2012.01) | |
| G06Q 10/10 | (2012.01) | |

(Continued)

(52) U.S. Cl.
CPC ...... *G06F 17/2785* (2013.01); *G06F 17/30867* (2013.01); *G06N 99/005* (2013.01); *G06Q 10/0639* (2013.01); *G06Q 10/10* (2013.01); *G06Q 30/02* (2013.01); *G06Q 30/0253* (2013.01); *H04L 51/02* (2013.01); *H04L 12/5805* (2013.01); *G06F 9/4446* (2013.01)

USPC .......................................................... 709/219

(58) Field of Classification Search
CPC ............................ H04L 51/02; H04L 12/5805
USPC .......................................................... 709/219
See application file for complete search history.

(56) References Cited

U.S. PATENT DOCUMENTS 6,032,129 A * 2/2000 Greef et al. ................. 705/26.43
6,349,290 B1 * 2/2002 Horowitz et al. ............... 705/35
(Continued)

OTHER PUBLICATIONS

Smart Solutions, Better Conversation. www.upsellit.com/solutions.jsp. May 5, 2010.

(Continued)

*Primary Examiner* — Ario Etienne
*Assistant Examiner* — Blake Rubin
(74) *Attorney, Agent, or Firm* — Fleit Gibbons Gutman Bongini & Bianco PL; Jon A. Gibbons

(57) ABSTRACT

The present invention is uniquely designed to interact with web retailer's customers with real agent reaction times as they give astute answers directly concerning web retailer's products and goals. The entire process is manageable through a third-party website which includes scripting, settings and other parameters selected by the web retailer. An artificial intelligence engine uses the combination of Bayesian probability keyword selection, natural language parsing and regular expression processing. The technology updates its response database with every client interaction-learning always takes place as it simulates a live agent, in real time. Every client interaction is recorded and analyzed, and as a result of the analysis the changes in the answer database are made.

34 Claims, 26 Drawing Sheets

(51) Int. Cl.
*G06Q 30/02* (2012.01)
*H04L 12/58* (2006.01)
*G06F 9/44* (2006.01)

(56) References Cited

U.S. PATENT DOCUMENTS

| | | | |
|---|---|---|---|
| 6,604,141 B1* | 8/2003 | Ventura | 709/227 |
| 6,606,744 B1* | 8/2003 | Mikurak | 717/174 |
| 7,170,993 B2* | 1/2007 | Anderson et al. | 379/265.09 |
| 7,552,365 B1* | 6/2009 | Marsh et al. | 714/47.2 |
| 7,603,413 B1* | 10/2009 | Herold et al. | 709/204 |
| 7,689,432 B2* | 3/2010 | Gross | 705/14.73 |
| 7,739,329 B2* | 6/2010 | Thompson | 709/203 |
| 7,814,041 B2* | 10/2010 | Caporale et al. | 706/51 |
| 8,086,462 B1* | 12/2011 | Alonso et al. | 704/275 |
| 2001/0042023 A1* | 11/2001 | Anderson et al. | 705/26 |
| 2002/0005865 A1* | 1/2002 | Hayes-Roth | 345/706 |
| 2002/0073208 A1* | 6/2002 | Wilcock et al. | 709/227 |
| 2002/0133347 A1 | 9/2002 | Schoneburg et al. | |
| 2003/0154120 A1* | 8/2003 | Freishtat et al. | 705/9 |
| 2003/0167195 A1* | 9/2003 | Fernandes et al. | 705/8 |
| 2003/0182391 A1* | 9/2003 | Leber et al. | 709/217 |
| 2003/0195811 A1* | 10/2003 | Hayes, Jr. et al. | 705/26 |
| 2004/0030750 A1* | 2/2004 | Moore et al. | 709/204 |
| 2004/0153357 A1* | 8/2004 | De Sylva | 705/9 |
| 2006/0026071 A1 | 2/2006 | Radwin | |
| 2006/0036430 A1 | 2/2006 | Hu | |
| 2006/0069546 A1* | 3/2006 | Rosser et al. | 704/9 |
| 2006/0080130 A1* | 4/2006 | Choksi | 705/1 |
| 2006/0122917 A1* | 6/2006 | Lokuge et al. | 705/27 |
| 2006/0150119 A1* | 7/2006 | Chesnais et al. | 715/810 |
| 2007/0198368 A1* | 8/2007 | Kannan et al. | 705/26 |
| 2007/0203693 A1 | 8/2007 | Estes | |
| 2008/0189367 A1* | 8/2008 | Okumura | 709/204 |
| 2008/0215995 A1 | 9/2008 | Wolf | |
| 2008/0221892 A1* | 9/2008 | Nathan et al. | 704/257 |
| 2008/0288349 A1 | 11/2008 | Weisberg et al. | |
| 2009/0100160 A1 | 4/2009 | Bowerman | |
| 2009/0216691 A1* | 8/2009 | Borzestowski et al. | 706/11 |
| 2009/0245500 A1* | 10/2009 | Wampler | 379/265.09 |
| 2009/0248399 A1* | 10/2009 | Au | 704/9 |
| 2009/0254417 A1 | 10/2009 | Beilby et al. | |
| 2009/0254836 A1 | 10/2009 | Bajrach | |
| 2009/0276704 A1* | 11/2009 | Finn et al. | 715/706 |
| 2009/0292778 A1 | 11/2009 | Makar et al. | |
| 2010/0293560 A1* | 11/2010 | Bland et al. | 719/328 |
| 2011/0055309 A1* | 3/2011 | Gibor et al. | 709/202 |
| 2013/0167004 A1* | 6/2013 | Goldman | 715/234 |

OTHER PUBLICATIONS

Intellichat Automated Virtual Sales Agent: Increase Conversions. www.intellichat.com. May 5, 2010. p. 1-2.

Internet Archive. www.archive.org for www.upsellit.com. May 11, 2010.

Internet Archive. www.archive.org for www.intellichat.com. May 11, 2010.

Internet Archive. www.archive.org for www.intellichat.com for May 26, 2007. Search May 11, 2010.

Sloan, P., "That online chat 'assistant' may not be real." CNN Money, Dec. 17, 2007. Retrieved from http://money.cnn.com/2007/12/14/technology/sloan_upsellit.fortune/., pp. 1-3.

Morphy, E., "The Brave New Mashed-Up World of Online Sales." CRM Buyer, Jan. 31, 2008. retrieved from http://www.crmbuyer.com/story/61466.html., pp. 1-2.

Non-Final Office Action dated Oct. 15, 2013 received for U.S. Appl. No. 13/277,420.

* cited by examiner

| | | Events | Responses |
|---|---|---|---|
| ☑ | ✎ | sales | We can typically increase sales or conversions by 4-20%. It's very easy to test the service, and there are no upfront costs to test. We are totally performance based. |
| ☒ | ✎ | hey | Hey yourself, how can I help you? |
| ☒ | ✎ | performance | We have a broad customer base and our clients are very happy with my performance. |
| ☒ | ✎ | both | I support both customer recovery and up-selling |
| ☒ | ✎ | sale | If you want to run a sale, I can be programmed to have specific responses that will support that sale. |
| ☒ | ✎ | link links | I use links with your affiliate ID for me to take customers back to your site. |
| ☒ | ✎ | ic | Adding TSA to your site is easy. There are no setup fees and typically you can start in less than a few days. |
| ☒ | ✎ | no ! no nay | I hope you can give me a minute to try to convince you that I can increase your revenue. Just ask How. |
| ☒ | ✎ | located | If you are asking ME where I'm located, I'm in a server in Boca Raton, Florida. Thats the same place my company is. |
| ☒ | ✎ | live sites | I am live on a number of retail, lead gen and registration sites. Contact us at 561-361-7887 x226. |
| ☒ | ✎ | live site | I am live on a number of retail, lead gen and registration sites. Contact us at 561-361-7887 x226. |
| ☒ | ✎ | cross-sell | While I can recover lost customers I can also up-sell and cross-sell products after your customer has completed their order or registration. |
| ☒ | ✎ | up-sell | While I can recover lost customers I can also up-sell and cross-sell products after your customer has completed their order or registration. |
| ☒ | ✎ | upsell | While I can recover lost customers I can also up-sell and cross-sell products after your customer has completed their order or registration. |
| ☒ | ✎ | abandon | I can launch when someone abandons your shopping cart or registration form. {break} I can upsell as well, so if they complete an order I can attempt to sell them another product. |
| ☒ | ✎ | browser | I have special technology that allows me to launch with Mozilla Firefox browsers. I can also launch with Microsoft IE browsers. |
| ☒ | ✎ | ie browser | I have special technology that allows me to launch with Mozilla Firefox browsers. I can also launch with Microsoft IE browsers. |

| Select Sites | Manage Campaigns | Manage Links | Agent Settings | Manage Account | Reports | Support Center |

Start Date: 2/1/2008  12:00 AM  
End Date: 2/14/2008  11:59 PM  
Company: Delfin Project, Inc.  
Site: Demo  
Campaign: Default  
Report: Campaign Performance  
⦿ Day ○ Hour ○ Interval  
[Generate Report] [Cancel Report]

|◁ ◁ 1 of 1 ▷ ▷| Page Width ▼  Find | Next   Select a format ▼  Export

Campaign Performance Report

Company: Delfin Project, Inc

| Site Name | Campaign Name | Date | Launched | Engaged | Clicked | Engaged/Launched | Clicked/Engaged | Clicked/Engaged |
|---|---|---|---|---|---|---|---|---|
| Demo | | | 46 | 23 | 4 | 50.00 % | 8.70 % | 17.39% |
| | Default | | 46 | 23 | 4 | 50.00 % | 8.70 % | 17.39 % |
| | | 2/1/2008 12:00:00 AM | 3 | 0 | 0 | 0.00 % | 0.00 % | 0.00 % |
| | | 2/2/2008 12:00:00 AM | 4 | 3 | 0 | 75.00 % | 0.00 % | |
| | | 2/7/2008 12:00:00 AM | 1 | 0 | 0 | 0.00 % | 0.00 % | |
| | | 2/4/2008 12:00:00 AM | 2 | 0 | 0 | 0.00 % | 0.00 % | |
| | | 2/5/2008 12:00:00 AM | 5 | 1 | 1 | 20.00 % | 20.00 % | 100.00 % |
| | | 2/6/2008 12:00:00 AM | 1 | 1 | 0 | 100.00 % | 0.00 % | 0.00 % |
| | | 2/1/2008 12:00:00 AM | 2 | 1 | 0 | 50.00 % | 0.00 % | 0.00 % |
| | | 2/5/2008 12:00:00 AM | 3 | 2 | 0 | 66.87% | 0.00 % | 0.00 % |
| | | 2/9/2008 12:00:00 AM | 1 | 0 | 0 | 0.00 % | 0.00 % | |
| | | 2/10/2008 12:00:00 AM | 1 | 0 | 1 | 0.00 % | 100.00 % | 100.00 % |
| | | 2/11/2008 12:00:00 AM | 10 | 8 | 1 | 80.00% | 10.00 % | 12.50% |
| | | 2/12/2008 12:00:00 AM | 10 | 5 | 1 | 50.00 % | 10.00 % | 20.00 % |

Select Sites / Manage Campaigns / Manage Links / Agent Settings / Manage Account / Reports / Support Center Start Date: 2/1/2008  12:00 AM
End Date: 2/14/2008  11:59 PM Company: Delfin Project, Inc.
Site: Demo
Campaign: Default Report: User Questions
[Generate Report] [Cancel Report]

|◁ ◁ 1 of 1 ▷ ▷|  Page Width ▽   [Find | Next]  Select a format  ▽ Export

User Questions Report

Company: Delfin Project, Inc. — 227

| Site Name | Campaign Name | Keywords ✦ | Response | Count ✦ |
|---|---|---|---|---|
| Demo | | | | 227 |
| | Default | | | 227 |
| | | ⊞ how | My artificial intelligence allows me to collect responses from customers, then analyze those responses and craft more relevant answers. [break] Then I can guide your customer back to your registration page or shopping to complete the sale. [break] Do you have a retail site, lead gen or membership site? | 18 |
| | | ⊞ hi | Great! Thanks for giving me a chance to show you how I can help generate more revenue from your website. [break] Just ask me how | 10 |
| | | ⊞ show me | What kind of questions can I answer? I'm here to help. | 10 |
| | | ⊞ exit pop | Some traffic sources do not allow exit pops. this is true. [break] However if we are on second page of the site most times we are allowed to recover customers for you. Also not all traffic sources consider us an "exit" pop. | 9 |
| | | ⊞ how much | The co at to set me up is zero and I only ask to get paid on a | 8 |

| Select Sites | Manage Campaigns | Manage Links | Agent Settings | Manage Account | Reports | Support Center |
|---|---|---|---|---|---|---|
| Start Date: 2/1/2008 🗓 12:00 AM ▾ | | | Company: Delfin Project, Inc. ▾ | | Report: User Response ▾ | |
| End Date: 2/14/2008 🗓 11:59 PM ▾ | | | Site: Demo ▾ | | | |
| | | | Campaign: Default ▾ | | Generate Report  Cancel Report | |

⏮ ◁ [ 1 ] of 4 ▷ ⏭  [Page Width ▾]  [        ] Find | Next  [Select a format ▾] Export 📷 🖨

User Response Report

Company: Delfin Project, Inc

| Site Name | Campaign Name | | | | | Count |
|---|---|---|---|---|---|---|
| Demo | | | | | | 192 |
| | Default | | | | | 192 |
| | | Keywords | | | Response | |
| | | | a problem | | I didn't understand your question can you ask me in a different way? Thanks. | 1 |
| | | | | | mah english misunderstood? | 1 |
| | | | afraid | | I didn't understand your question can you ask me in a different way? Thanks. | 1 |
| | | | | | bombs | 1 |
| | | | agent setup | | You can setup your own agent or we can do it for you. Basically we use FAQs or the same material you would use for a live agent to train TSA | 1 |
| | | | | | is here again | 1 |
| | | | angelina | | I didn't understand your question can you ask me in a different way? Thanks. | 1 |
| | | | | | grandpa | 1 |
| | | | angelina grandpa | | I didn't understand your question can you ask me in a different way? Thanks. | 1 |
| | | | | | ur name | 1 |
| | | | angelina granpa | | I didn't understand your question can you ask me in a different way? Thanks. | 1 |

FIG. 23

| Select Sites | Manage Campaigns | Manage Links | Agent Settings | Manage Account | Reports | Support Center |
|---|---|---|---|---|---|---|
| | Start Date: 2/1/2008 📅 12:00 AM ⌄ | | | Company: Delfin Project, Inc. ⌄ | Report: Keywords ⌄ | |
| | End Date: 2/14/2008 📅 11:59 PM ⌄ | | | Site: Demo ⌄ | | |
| | | | | Campaign: Default ⌄ | | |

◁ ▽ [1] of 1 ▷ ▷▷ | Page Width ⌄ | | Find | Next | Select a format ⌄ | Export 🖻 🗗 | Generate Report | Cancel Report

Keywords Report

Company: Delfin Project, Inc

| Site Name | Campaign Name | Keywords | % | Count |
|---|---|---|---|---|
| Demo | | | 0.75% | 134 |
| | Default | | 0.75% | 134 |
| | | | 0.75% | 134 |
| | | agent setup | 0.75% | 1 |
| | | answer | 0.75% | 1 |
| | | click to call | 0.75% | 1 |
| | | clients | 0.75% | 1 |
| | | cool | 0.75% | 1 |
| | | cost | 0.75% | 1 |
| | | CPA | 3.73% | 5 |
| | | cya good bye goodbye bye | 1.49% | 2 |
| | | easy | 0.75% | 1 |
| | | exit pop | 6.72% | 9 |
| | | hello | 2.99% | 4 |
| | | hey | 2.24% | 3 |
| | | hi | 7.48% | 10 |

FIG. 24

| Select Sites | Manage Campaigns | Manage Links | Agent Settings | Manage Account | Reports | Support Center |
|---|---|---|---|---|---|---|
| Start Date: 2/1/2008 12:00 AM | | | Company: Delfin Project, Inc. | | Report: Unrecognized Questions | |
| End Date: 2/14/2008 11:59 PM | | | Site: Demo | | | |
| | | | Campaign: Default | | Generate Report   Cancel Report | |

|◁ ◁ 1 of 2 ▷ ▷| Page Width ▽ | | Find | Next | Select a format ▽ | Export |

Unrecognized Questions Report

Company: Delfin Project, Inc

| Site Name | Campaign Name | Unrecognized Questions | % | Count |
|---|---|---|---|---|
| Demo | | | 1.08% | 93 |
| | Default | | | 93 |
| | | a problem | 1.08% | 93 |
| | | afraid | 1.08% | 1 |
| | | and u put your face all over scams | 1.08% | 1 |
| | | angelina | 1.08% | 1 |
| | | angelina grandpa | 1.08% | 1 |
| | | angelina granpa | 1.08% | 1 |
| | | are | 1.08% | 1 |
| | | ashely | 1.08% | 1 |
| | | ashlee | 1.08% | 1 |
| | | ashlei | 1.08% | 1 |
| | | be my guest | 3.23% | 3 |
| | | bombs | 1.08% | 1 |
| | | cacao | 1.08% | 1 |
| | | caroline | 2.16% | 2 |

FIG. 25

| Select Sites | Manage Campaigns | Manage Links | Agent Settings | Manage Account | Reports | Support Center |
|---|---|---|---|---|---|---|
| | Start Date: 2/1/2008 📅 12:00 AM ▾ | | Company: Delfin Project, Inc. ▾ | | Report: Link Clicks by Response ▾ | |
| | End Date: 2/14/2008 📅 11:59 PM ▾ | | Site: Demo ▾ | | | |
| | | | Campaign: Default ▾ | | Generate Report   Cancel Report | |

◁◀ 1 of 1 ▷▶ | Page Width ▾ | | Find | Next | Select a format ▾ | Export

Link Clicks by Response Report

Company: Delfin Project, Inc

| Site Name | Campaign Name | Link Name | Response | Clicks |
|---|---|---|---|---|
| Demo | | | | 4 |
| | Default | | | 4 |
| | | DelFin Contact | Are you still there? Type something and let me know. | 4 |
| | | DelFin Contact | Hi Thanks for giving me a chance to tell you a little bit about how I work. (break) Do you have a retail, lead gen or membership site? | 1 |
| | | DelFin Contact | This limited demo is designed to give you an idea of how I work. it is not intended to answer all your questions. (break) For more information contact the DelFin sales team by {link: 1l: Clicking Here} | 1 |
| | | DelFin Contact | We charge only for recovered sales on a cpa basis. So if we don't perform you don't pay. | 1 |

FIG. 26

| Select Sites | Manage Campaigns | Manage Links | Agent Settings | Manage Account | Reports | Support Center |
|---|---|---|---|---|---|---|
| | Start Date: 2/1/2008 📅 ⌄ | | Company: Delfin Project, Inc. ⌄ | | Report: Greeting Performance ⌄ | |
| | End Date: 2/14/2008 📅 ⌄ | | Site: Demo ⌄ | | | |
| | | | Campaign: Default ⌄ | | Generate Report   Cancel Report | |

⏮ ◁ [ 1 ] of 1 ▷ ⏭   [ Page Width ⌄ ]   [         ] Find | Next   [Select a format ⌄] Export 💾 🖨

Greeting Performance Report

Company: Delfin Project, Inc

| Site Name | Campaign Name | Response Text | Launched | Clicked/Launched | Engaged/Launched | Clicked/Engaged |
|---|---|---|---|---|---|---|
| Demo | | | 46 | 8.70% | 50.00% | 17.39% |
| | Default | Hi I'm your chat based sales agent {nickname} Type "Hi" or "Hello" just to let me know if we can chat for a second. | 46 | 8.70% | 50.00% | 17.39% |
| | | | 46 | 8.70% | 50.00% | 17.39% |

FIG. 27

| Select Sites | Manage Campaigns | Manage Links | Agent Settings | Manage Account | Reports | Support Center |
|---|---|---|---|---|---|---|
| | Start Date: 2/1/2008 📅 12:00 AM ⌄ | | Company: Delfin Project, Inc. ⌄ | | Report: Agent Photo Performanc ⌄ | |
| | End Date: 2/14/2008 📅 11:59 PM ⌄ | | Site: Demo ⌄ | | | |
| | Position: ALL ⌄ | | Campaign: Default ⌄ | | | |
| ⊲ ◁ 1 of 1 ▷ ⊳ | Page Width ⌄ | | Find | Next | Select a format ⌄ | Export | | Generate Report | Cancel Report |

Agent Photo Performance Report

| Picture ⇕ | Position | Launched ⇕ | Engaged ⇕ | Clicked ⇕ | Clicked/Launched ⇕ | Engaged/Launched ⇕ | Clicked/Engaged ⇕ |
|---|---|---|---|---|---|---|---|
| | | 46 | 23 | 4 | 50.00% | 8.70% | 17.39% |
| ⊞ Woman/f01 | | 29 | 12 | 2 | 41.38% | 6.90% | 16.67% |
| ⊞ Woman/f02 | | 2 | 1 | 0 | 50.00% | 0.00% | 0.00% |
| ⊞ Woman/f03 | | 1 | 1 | 0 | 100.00% | 0.00% | 0.00% |
| ⊞ Woman/f04 | | 1 | 0 | 0 | 0.00% | 0.00% | 0.00% |
| ⊞ Woman/f05 | | 1 | 1 | 1 | 100.00% | 100.00% | 100.00% |

FIG. 28

| Select Sites | Manage Campaigns | Manage Links | Agent Settings | Manage Account | Reports | Support Center |
|---|---|---|---|---|---|---|
| | Start Date: 2/1/2008 🔽 12:00 AM 🔽 | | Company: Delfin Project, Inc. 🔽 | | Report: Agent Photo Performanc 🔽 | |
| | End Date: 2/14/2008 🔽 11:59 PM 🔽 | | Site: Demo 🔽 | | | |
| | Position: ALL 🔽 | | Campaign: Default 🔽 | | Generate Report | Cancel Report |

| ◁ ◀ | 1 | of 1 ▷ ▶| | | Find | Next | Select a format | ▼ Export | | ◀ | | |
|---|---|---|---|---|---|---|---|

Agent Location Performance Report

| Position ⬍ | Picture | Launched ⬍ | Engaged ⬍ | Clicked ⬍ | Engaged/Launched ⬍ | Clicks/Launched ⬍ | Clicks/Engaged ⬍ |
|---|---|---|---|---|---|---|---|
| | | 46 | 23 | 4 | 50.00% | 8.70% | 17.39% |
| ⊞ Center | | 29 | 12 | 2 | 41.38% | 6.90% | 16.67% |
| ⊞ Top Left | | 7 | 4 | 1 | 57.14% | 14.29 | 25.00% |
| ⊞ Top Right | | 10 | 7 | 1 | 70.00% | 10.00% | 14.29% |

FIG. 29

MANAGEMENT SYSTEM FOR A CONVERSATIONAL SYSTEM

CROSS-REFERENCE TO RELATED APPLICATIONS

This application is a continuation-in-part of and claims priority from prior U.S. patent application Ser. No. 12/124,531, filed on May 21, 2008, now U.S. Pat. No. 7,962,578, the entire disclosure of each application is incorporated by reference in its entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This present invention generally relates to the field of exit-pops for web browser and chatbots and more particularly to a tool for creating and deploying a messaging window on the user's computer when a user exits a given web site.

BACKGROUND OF THE INVENTION

Consumers continue to demand and expect high quality, highly personalized interactions with internet based products and services. Simultaneously, web retailers constantly look for opportunities to reduce the rate at which user's abandon their web sites prior to completing registration and abandon shopping carts before final checkout. There are many reasons why users abandon interactions with websites. One reason is consumers are often distracted or confused when interacting with websites. Distractions can be caused by interruptions or simply by rushing or simply a change in expectation i.e. registration to the website is required. For example, social networking sites typically require registration. Many times a user will often become bashful or unwilling to share information. Although the term "web retailers" are used through out this application, it is important to note that the term Lead generation (commonly abbreviated as lead-gen) is a marketing term that refers to the creation or generation of prospective consumer interest or inquiry into a business' products or services. Often, lead generation is associated with marketing activity targeted at generating sales opportunities for a company's sales force. Therefore, a lead is correctly described as information regarding or provided by a consumer that may be interested in making a purchase. Whereas, generation is one of a myriad of activities that may produce that information and perceived interest.

In order to reduce an abandonment of a shopping cart or web session by a user, several retailers have begun using chatbots. A chatbot (or chatterbot) is a type of conversational agent designed to initiate conversation with humans in auditory or text forms. Web-based chatbots are designed to automatically answer any questions and inquiries over e-mail and text messaging. Most chatbots simply scan for one or more keywords within the input and pull a reply from a database.

Chatbots although useful are not without their challenges, problems and shortcomings. One problem is that chatbots are not easy to deploy and maintain. Third party services take websites and create scripts for chatbots tied to a given website. The web retailer must rely on third party services to not only create and deploy chatbot for a particular website, but also to receive reporting data on how the chatbot is performing.

Another challenge with deploying chatbots is that the scripts and other artificial intelligence (AI) are not managed by the web retailer. This is a problem because the web retailer has no information on the traffic exiting their websites. For example, how many users exit a website, why the user exists, and the information about the user including demographics or other information such as what keyword responses are being used and no way to track results.

Accordingly what is needed is a method and system to overcome the problems with the deployment and management of chatbots and to provide a management system to web retailers using chatbot technology.

SUMMARY OF THE INVENTION

The present invention also known as TeamSalesAgent™ (TSA) is the solution for e-commerce websites and web-enabled applets presenting web pages interested in increasing sales, dramatically improving their level of customer service and decreasing the company's overhead costs of using "live" sales agents. This unique chat technology fuses self-learning artificial intelligence with the popularity and ease of online messaging. TeamSalesAgent works 24/7/365 to deliver increased conversions and decreased abandonment.

TeamSalesAgent Benefits include
Make web retailer's site interactive.
Adds social interaction to social networking sites.
Increase web retailer's registrations/memberships.
Increase web retailer's sales.
Increase web retailer's conversation rates.
Drastically decrease web retailer's shopping cart abandonment.
Make web retailer's site interactive.
Up-Sell & Cross-Sell additional products.
No turn around time for customers-immediate service!
Easy integration.
Real time success and failure analysis to new products and sales efforts.

The present invention is uniquely designed to interact with web retailer's customers with real agent reaction times as they give astute answers directly concerning web retailer's products and goals. The patent-pending artificial intelligence engine uses the combination of Bayesian probability and statistics keyword selection, natural language parsing and regular expression processing. Every client interaction is recorded and analyzed, and as a result of the analysis the changes in the answer database are made.

More specifically, the present invention provides a method to present a browser-based chat and messaging window ("chat window") made to look like an instant message window from a live person as an exit pop when a user exits a web site. Many times, a user will abruptly terminate a shopping cart, registration or lead abandonment at a website. The method comprising the steps of: presenting at least one messaging window after the user terminates a web session; displaying a message to the user through the messaging window; reviewing a response from the user using a combination of scripting and artificial intelligence; wherein the scripting, the messaging window and the artificial intelligence are all managed via a web site.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 7 is an example initial screen of the TSA management console, once the web retailer is logged-in, according to the present invention;

FIG. 8 is an example screen of the TSA management console for setting up the contact and company information, according to the present invention;

FIG. 9 is an example screen of the TSA management console for agent settings when configuring the chat window, according to the present invention;

FIG. 13 is an example screen of the TSA management console for editing links, according to the present invention;

FIG. 14 is an example screen of the TSA management console for managing campaigns, according to the present invention;

FIG. 15 is an example screen of the TSA management console for adding or editing campaigns, according to the present invention;

FIG. 16 is an example screen of the TSA management console for showing events, according to the present invention;

FIG. 17 is an example screen of the TSA management console for adding or editing events, according to the present invention;

FIG. 18 is an example screen of the TSA management console showing keywords, according to the present invention;

FIG. 19 is an example screen of the TSA management console for adding or editing keywords, according to the present invention;

FIG. 20 is an example screen of the TSA management console for viewing reports, according to the present invention;

FIG. 21 is an example screen of the TSA management console for viewing campaign performance reports, according to the present invention;

FIG. 22 is an example screen of the TSA management console for viewing user questions reports, according to the present invention;

FIG. 23 is an example screen of the TSA management console for viewing user response reports, according to the present invention;

FIG. 24 is an example screen of the TSA management console for viewing keyword reports, according to the present invention;

FIG. 25 is an example screen of the TSA management console for viewing unrecognized questions reports, according to the present invention;

FIG. 26 is an example screen of the TSA management console for viewing link clicks by response reports, according to the present invention;

FIG. 27 is an example screen of the TSA management console for viewing greeting performance reports, according to the present invention;

FIG. 28 is an example screen of the TSA management console for viewing agent photo performance reports, according to the present invention;

FIG. 29 is an example screen of the TSA management console for viewing agent location performance reports, according to the present invention;

DESCRIPTION OF THE PREFERRED EMBODIMENTS

Figure 1:
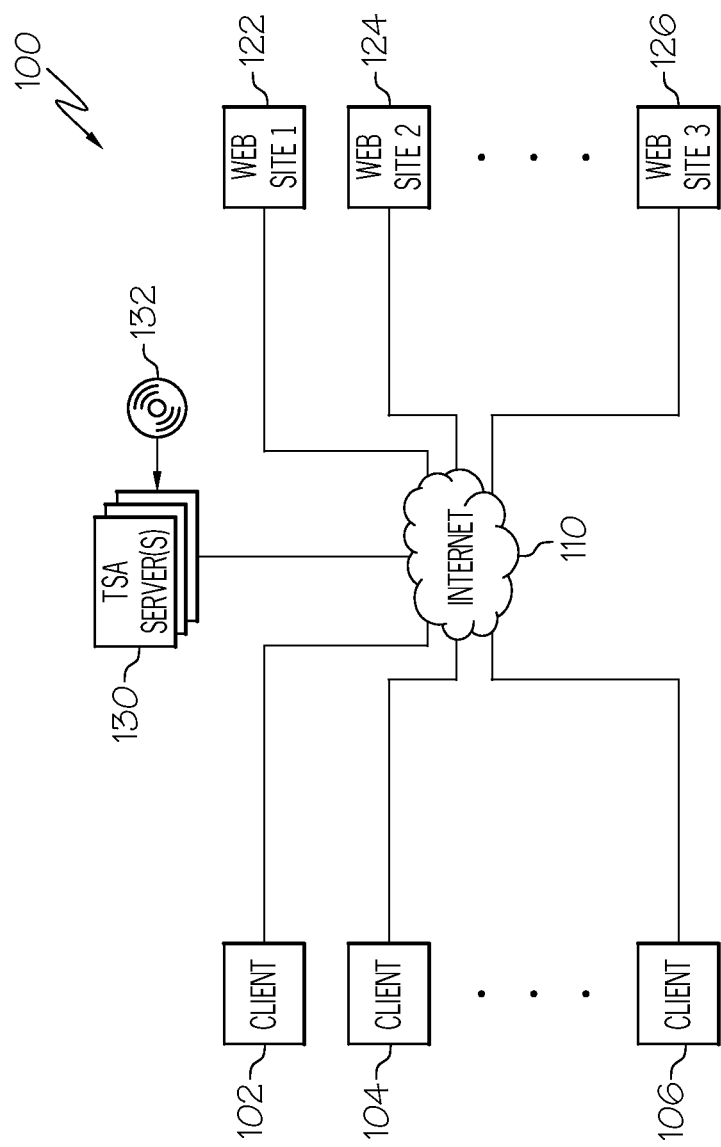
FIG. 1 is a diagram of the overall system 100 for managing deployment and reporting behavior of chatbots, according to the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as at least one or more than one. The term plurality, as used herein, is defined as two, or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on an information processing circuit. A program, computer program, or software application may include a subroutine, a function, a procedure, an object method, an object implementation, an executable application, an applet, a servlet, a source code, an object code, a shared library/dynamic load library and/or other sequence of instructions designed for execution on an information processing circuit. Further terms "present invention" and "Team Sales Agent" or "TSA" or application and applet are used interchangeably herein.

Prior to the present invention, publishers had to primarily rely on exit pops and follow-up emails to attempt to recover lost customers or cross-sell or up-sell them. The present invention is designed to effectively reduce shopping cart, lead and registration abandonment. The present invention had to be capable of up-selling and cross-selling as well while providing the customer with a satisfactory experience. The present invention is customer friendly and provides real-time campaign management and reporting for publishers. Powered by a self-learning artificial intelligence engine, the present invention assists publishers in increasing their revenue opportunities. The present invention has been successfully deployed and continually enhanced and improved to meet the changes and needs of a growing market.

The present invention recovers many users that abandon websites or web registration process. The chatbot assists with the return of a user to the website or redirection to a third party website for cross-selling or up-selling example: sell PC but direct to third party warranty company for the purpose of closing the sale, to cross sell, up-sell, or build customer relationship.

The present invention provides web retailers with tight control of the artificial intelligence (AI) programming with fast-setup to meet the demands of fast moving, easy to turn off and short-lived sales campaign. This is especially important to meet sales campaigns, sales promotions, regional customer demands and seasonal purchases.

Further, the term "campaign" is used to denote a web retailer's campaign during a specific period for a specific area of the web retailer's site. It is important to note that a campaign can be a global campaign, i.e. across multiple web retailers, a target campaign and a default campaign. If a web retailer has only one campaign, by definition it is the default campaign. Further, a "target campaign" can change frequently and be directed to only certain products and services offered through the web retailer's site.

Overall System

Turning now to FIG. 1 is a diagram of the overall system 100 for managing deployment and reporting behavior of chatbots. FIG. 1 shows one or more user or client systems 102, 104, and 106 communicatively coupled over a communications infrastructure 110 to one or more web servers hosting websites 122, 124, and 126. A user system can include a wireless device (e.g., a cellular telephone, a mobile phone, a smartphone and other wireless communication devices such as tablet computers), a laptop/computer, a desktop computer, and other information processing systems.

TeamSalesAgent server(s) 130 is also communicately coupled to the communications infrastructure 110. The TeamSalesAgent server(s) 130 can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. Although the exemplary embodiments of the present invention are described in the context of a fully functional computer system, those skilled in the art will appreciate that embodiments are capable of being distributed as a program product via CD or DVD, e.g. CD 132, or other form of recordable media, or via any type of electronic transmission mechanism.

Chatbot Chat Window

Figure 2:
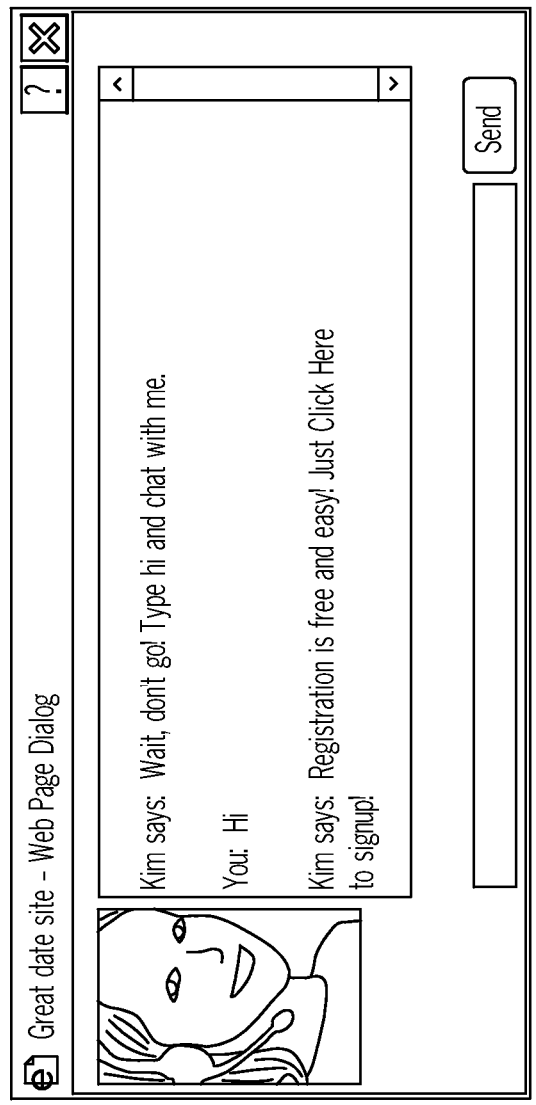
FIG. 2 is an example chatbot on a client system, according to the present invention.

FIG. 2 is an example chatbot chat window on a client system, according to the present invention. The chatbot runs on the client device 102, 104, and 106 typically after a predefined event. An event is either failure to complete a given process or some other predefined condition. Failed tasks include web site registration and shopping cart abandonment. A predefined event can also include a completed task such as shopping cart checkout, where the chatbot is used to cross-sell other services, such as warranty services. As shown in FIG. 2, in one embodiment the chat window is a messaging window.

When information regarding a specific user is known, the chatbot in one embodiment is customized dynamically to the specific user. For example, specific information about the user includes demographic information, such as, the user's address and/or zip code and/or age and/or gender and/or race. Information about the user can be derived through a variety of sources such previous registrations with the retailer's site, the user's IP address, previous interactions with the chatbot or through other sources. This feature enables highly customizable chatbots specifically tailored to the specific user.

The picture of the agent, in this example with the name Kim, or chatbot is shown along with a dialog box between Kim and a user (Web retailer). It is important to note that the layout of the chat window is not limited to the window shown and many configurations are contemplated within the true scope and spirit of the present invention. For example, in one embodiment, the skin or "look and feel" of the layout of standard and customizable user interface components and any accompanying graphics of the chatbot chat window can be customized. For example, retailer-A may want a certain color scheme and graphics to match their own corporate branding while retailer-B another color scheme and graphics to match their own corporate branding. These skin definitions are settable using the TSA management console described in more detail below. Furthermore, these skin definitions can be rotated just as the picture of the chatbot.

Chatbot Flow

Figure 3:
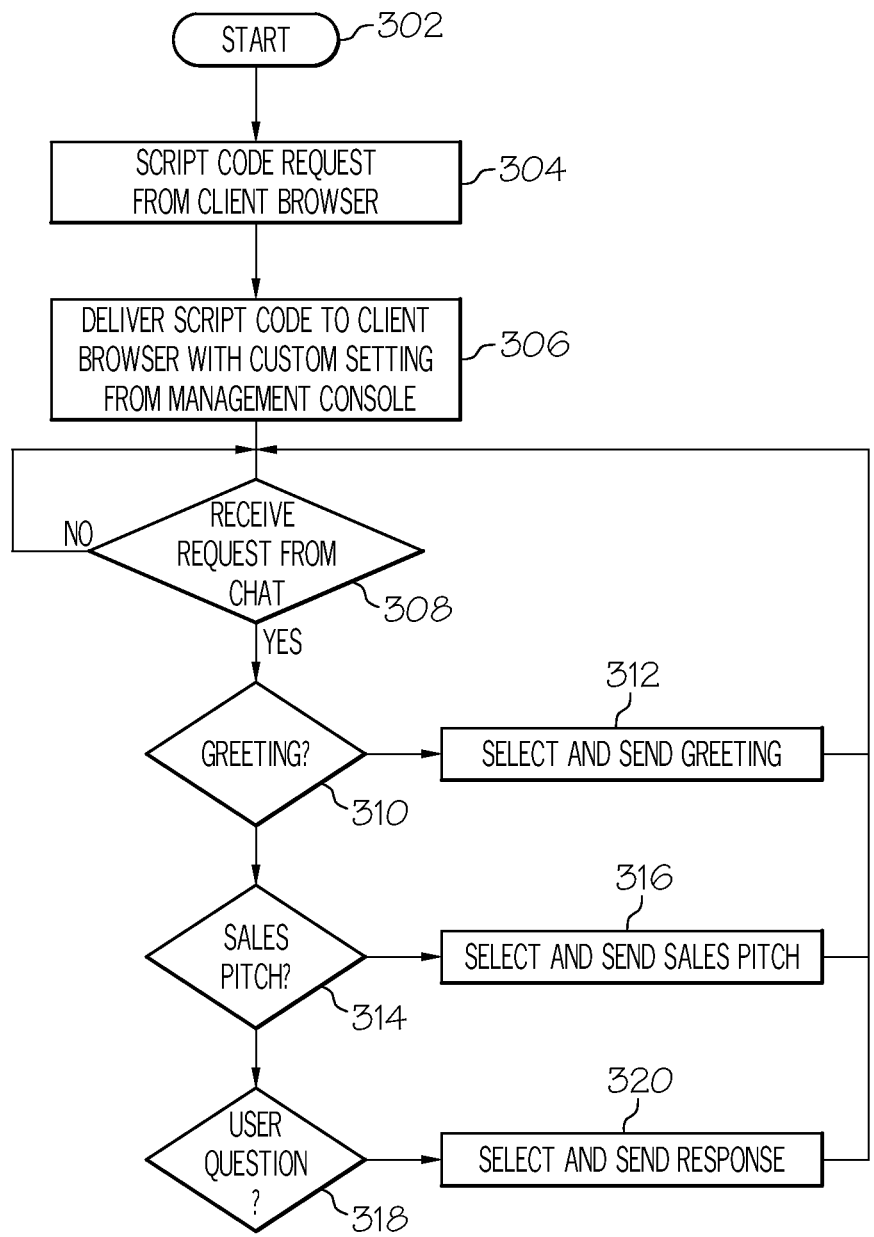
FIG. 3 is an example chatbot chat window flow from a TSA server perspective, according to the present invention.

FIG. 3 is an example chatbot chat window flow from a TSA server perspective, according to the present invention. This process runs when TSA chatbox window is loaded and the script request is from web retailer browsers. Examples of scripts used to integrate into a web retailers website are illustrated at the end of this patent. The script code is sent along with various settings from the web-based management console in step 306. Various parameters or user selectable components are set through the TSA management console for the script settings. The script settings can include pitch delay, "agent is typing" message, typing times, and reading timer. These are discussed further below.

In one embodiment, some of these settings are static, e.g. some timers, reading timers, typing timers, are the same for all chat sessions. Other embodiments of settings are dynamic, e.g. agent photo, agent name, agent picture position on screen, campaign ID, timers, and greetings, sent only for when the particular chat session is initiated. In another embodiment, the setting can be changed depending on information received from web retailers site, such as demographic information or even personal information such as name of chat user. Further information such as a name of the chatbot, a persona presented (personality such as youthful, mid-western, age, and educational level) to a user, and a national language of the chatbot.

The process loops waits for a request from the chat in step 308. Once a request is received from chat 308, the process continues with determining the type of response, e.g. is it a greeting 310, then select and output greeting 312 based on preferences setup in TSA management console. Likewise, if the request is a sales pitch request, e.g. is it a sales pitch 314 then select and output sales pitch 316 based on preferences setup in TSA management console. Alternatively, if the request is a user question request, e.g. is it a user question 318, then select and output response 320 based on preferences setup in TSA management console. A more detail explanation of the response selection process is discussed in FIG. 6 below.

Figure 4:
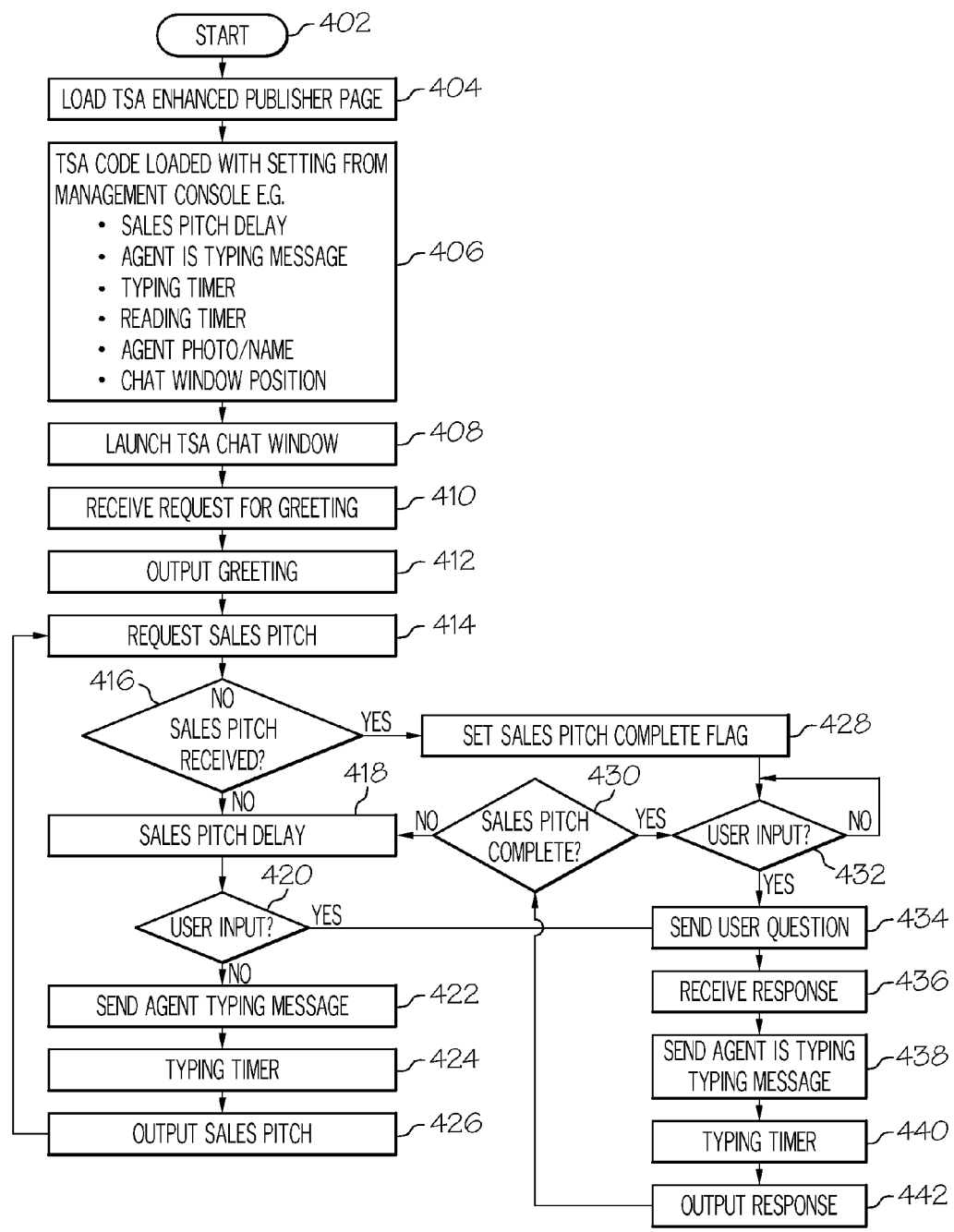
FIG. 4 is an example chatbot chat window flow from a TSA client perspective, according to the present invention.

FIG. 4 is an example chatbot chat window flow from a TSA client perspective, according to the present invention. The process begins at setup 402 and immediately proceeds to step 404 where the web retailer page with code for launching the chatbot is loaded. Examples of the code embedded in the web retailer page are shown at the end of this patent.

In step 406, the setting from the TSA management console are loaded such as, but not limited to, sales pitch delay, agent is typing message, typing timer, reading timer, agent photo/name, and chat windows position.

The chatbot runs on the client device 102, 104, and 106 typically after a predefined event. The TSA window can load on various events such as the user leaving a web page, an abandoned shopping cart, a webpage domain change, or other link selected. It should be understood the TSA window can launch on other events such as no input from the user for a predetermined amount of time. In one embodiment, an inactivity timer is used to trigger the predefined event. This inactivity timer is set in the TSA Management console along with other times. Still, in another embodiment, if the web page or primary applet is minimized, this is used to launch the chatbot. Still further, one or more cursor positions can be used to trigger when launching the chatbot such as the minimize cursor position, close cursor position, URL cursor position, help cursor position, hover for a period of time, and more. Accordingly, a decision is made whether or not to launch the chatbot chat window based on one or more even/response pair triggers. This decision to launch is made while the user is interacting with the web retailers page or while interacting with a specific applet.

Once the chatbot chat window is loaded in step 408 as shown in FIG. 2, the Greeting request is received 410 from the chat window and TSA server 130 produces the Output Greeting 412 to the chatbot chat window. Next a sales pitch is requested 414 and a response received from the TSA server 130. The system uses the sales pitch to sell, cross-sell or up-sell a product. The timing and when the sales pitch is displayed depends on whether a user of the chatbot chat window enters a question. The sales pitch can be a single entry or multiple entries to construct overall sales pitch. To begin, a test made to determine in step 416 if a No Sales Pitch was received. If a No Sales Pitch was received (i.e. because either the sales pitch is complete or the web retailer is not using a sales pitch) the flow continues to step 428 and sets the Sales Pitch Complete Flag. In response to a sales pitch received in step 416 (i.e. the test in step 416 results in "no"); the sales pitch delay timer is started in step 418. When the timer expires, a test is made for user input 420. If there is user input received, in step 420, the flow continues to step 434. In response to no user input received then in step 422 an "Agent is Typing" message is posted on the chat window (not shown) on FIG. 2. The "Agent is Typing" message is sent to notify the chat window user that a message is being formulated. This message is used to make the chatbot appear human rather than automated. Because a human typically will take time to read and type a response unlike a computer which is only limited by bandwidth and processing power, a delay "Typing Timer" 424 is set by configuration settings in the TSA management console. The sales pitch received as determined by the TSA management console settings is then printed in the chatbot chat window 426 and the process flows back to request another sales pitch 414 and then tests for another sales pitch or No Sales Pitch response 416.

In response to sales pitch was complete being exhausted i.e. No Sales Pitch 416 the Sales Pitch Complete Flag 428 is set. And a process loops on whether user input is received 432. Once a user question is received it is sent to TSA server 103 and a response is received 436. To avoid the appearance of being too fast responding to a user question, a message on the chat box chat window "agent is typing" is displayed in step 438 and typing timer is set in step 440 before presenting the response 442 to the user. In the event the sales pitch was completed in step 430, the process loops in step 432 waiting for user input. Otherwise, the sales pitch process is continued in step 418.

Figure 5:
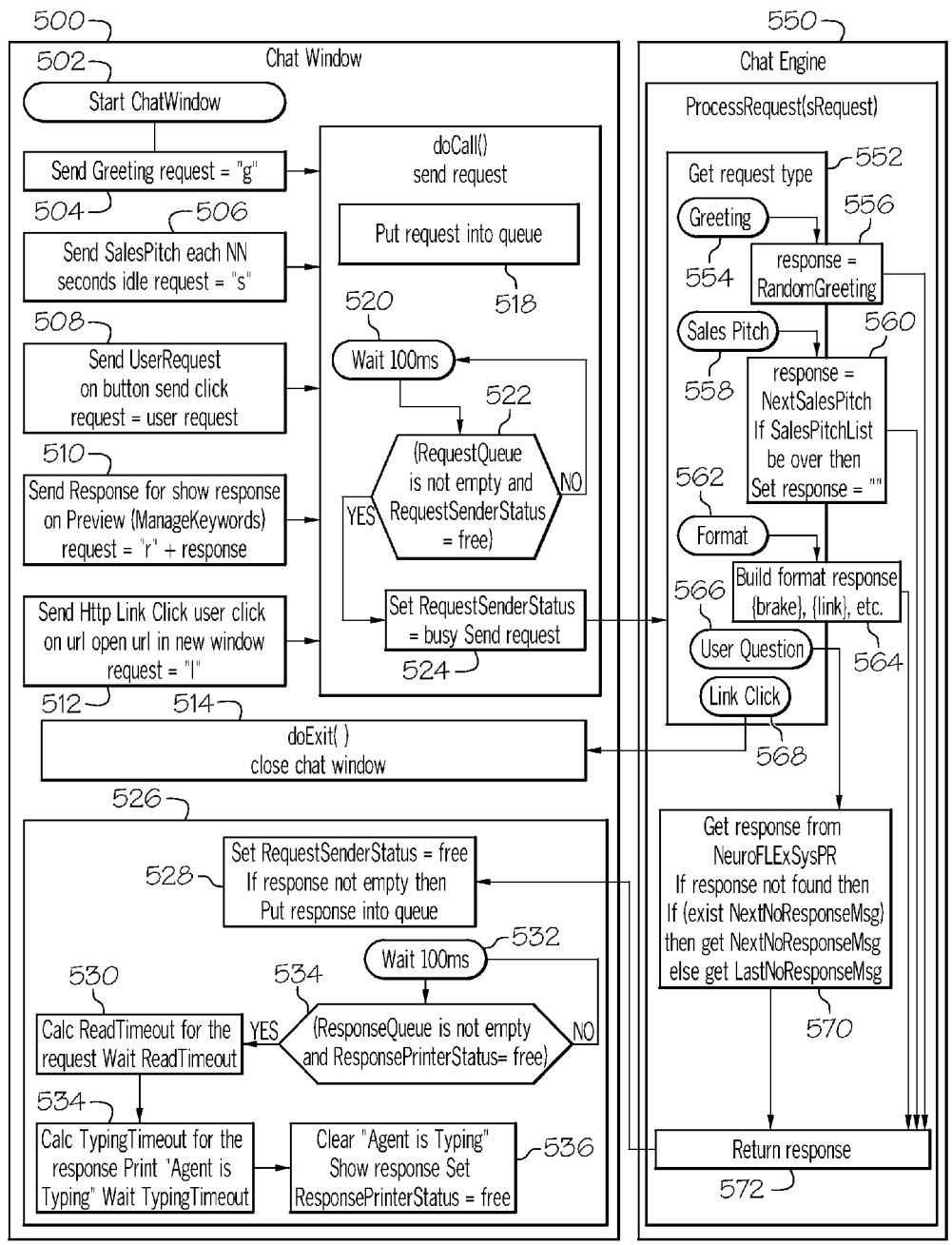
FIG. 5 is an example over-all flow from the TSA client-server perspective illustrating the interactions between the flows of FIG. 3 and FIG. 4, according to the present invention.

FIG. 5 is an example overall flow from the TSA client-server perspective illustrating the interactions between the flows of FIG. 3 and FIG. 4, according to the present invention. The chat window flow 500 begins with the chat window starting as described in FIG. 3 and example scripts discussed at the end of this patent. Boxes 504 "Send Greeting", 506 "Send Sales Pitch", 508 "Send User Request", 510 "Send Response", and 512 "Send HTTP Link Request" are various requests automatically made by the client 102, 104, and 106 to the TSA Server 130. The various requests 504, 506, 508, 510, and 512 as shown each go into a "Do Call Method" 516. The "Do Call Method" helps make the various calls synchronize with the Chat Engine 550 sitting on TSA server 130. The "Do Call Method" 516 includes a queue 518, Wait Time 520 by a predetermined number of seconds. The predetermined number of seconds is settable through the TSA management console and it should be understood that the 100 ms is an example only. The flags of Request Queue and the Request Sender Status 522 are used to determine whether the request is sent in 524 or the process loops back to Wait Time 520. This waiting and loop allow the "Do Call Method" 516 to synchronize if the request queue is "Empty" and the request sender status is "Free" so the message is sent out.

Chat engine 550 sitting on TSA server 130 receives request from the chat window 500 and finds answers to each request to send to the chat window 500. The process begins with Get Request Type 552 for passing the various requests to different sub-handlers depending on the type of the request. A response 572 is provided. There are two types of Request Types. A first type of request type is handled through the Engine 570 using artificial intelligence and/or neural networks. A second type of request type is handled by parameters, settings and responses for a campaign setup using the TSA management console. The sub-handlers include a sub-handler for "Greetings" 554, which tests whether the "Response=Random Greeting" is set by the TSA management console. The sub-handler "Sales Pitch" 558 and whether Reponse=MySite" is set by the TSA management console for a given campaign. The sub-handler "Format" 562 helps arrange and convert the answer to a request that is received from the chat window 500 based upon setting from the TSA management console. The sub-handler "Request" or "User Question" 566 handles general questions from a user typing in the Chat Window 500. The sub-handler "User Question" 566 using the Engine 570 to find a response.

The Engine 570 in one embodiment is a neural network engine. One example of an engine that has been shown to work advantageously with the present invention is disclosed in U.S. patent application Ser. No. 11/020,542, with inventors Gene I. KOFMAN et al., filed on Dec. 22, 2004 entitled AUTOMATIC CREATION OF NEURO-FUZZY EXPERT SYSTEM FROM ONLINE ANALYTICAL PROCESSING (OLAP) TOOLS" the teachings of which is hereby incorporated by reference in its entirety. The engine bases its responses on the probability of matches to a user question using NeuroFLexSysPR. For error checking purposes if no response is found to a question, a no response is selected.

The response is sent from the Chat Engine 550 to Chat Window 500 and the method 526 handles the presentation of the response to the User. It may delay the response depending on TSA management console in loop 532 and 534. There are several timers set at the management console such as "agent typing timer", "delay agent timer" and other timers to make the chat bot appear human. The "agent is typing" message 534 is used to notify the user that a response to their questions is being formulated and composed. This "agent is typing" message is cleared when the response is complete.

Figure 6:
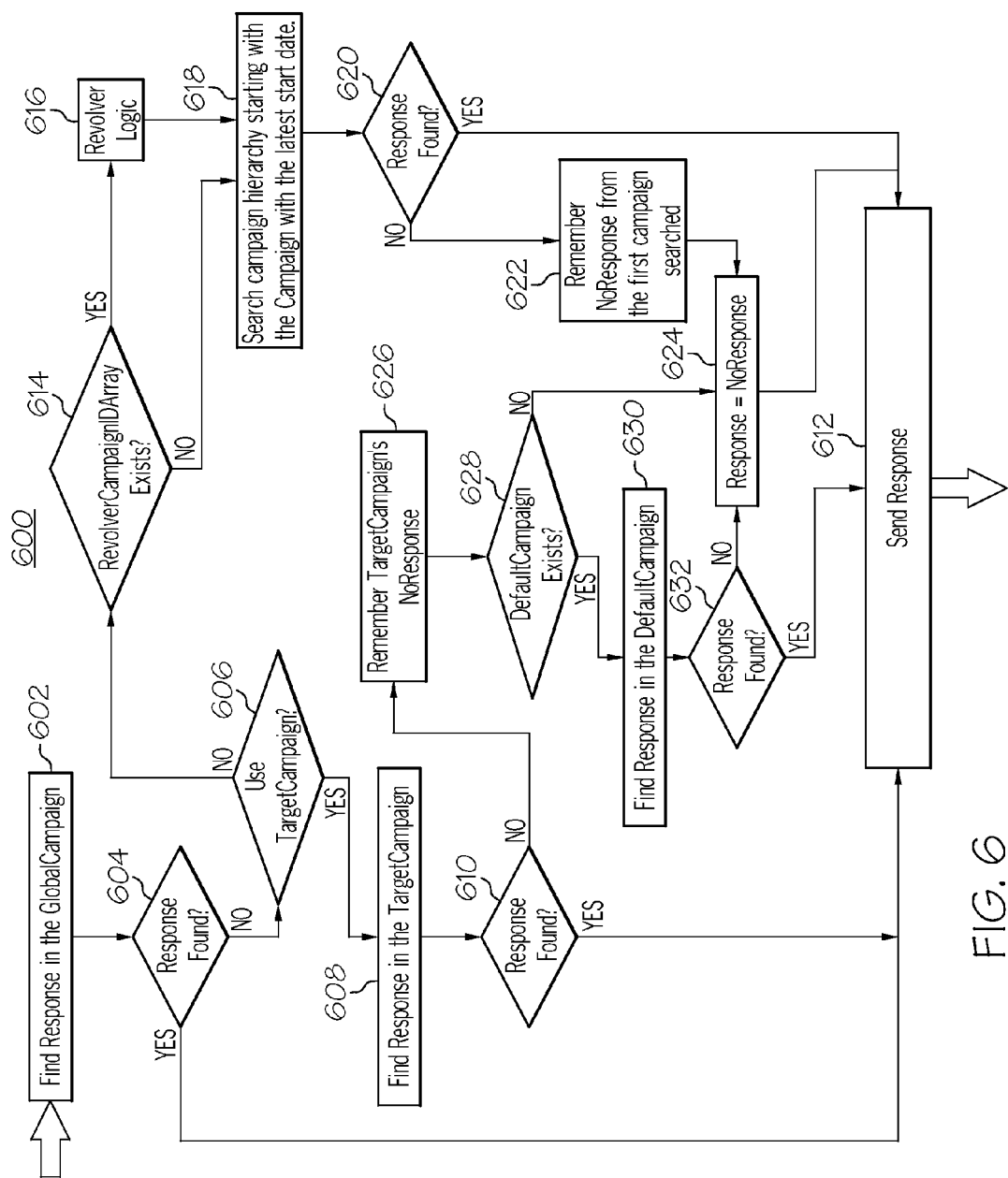
FIG. 6 is a more detailed flow of block 320 in FIG. 3 illustrating how the TSA server selects responses, according to the present invention.

FIG. 6 is an example overall flow diagram of how TSA server 130 selects a response in Chat Engine 570, according to the present invention. Again it is important to note that various parameters are set through the TSA management console by the web retailer such as campaign selection, decision method, keyword/response pairs, greetings, sales pitch, and a no response message. These are discussed further below.

The process begins at step 602 where responses to Global Campaigns are searched in order to identify user's questions that are to be handled the same, no matter what the web retailer's campaign. Next in step 604, if a response is found the response is sent in step 612. However, if a response is not found, a test is made to determine if this is part of a target campaign in step 606. If it is part of a target campaign setup by a web retailer to handle a special product line or situation, the response for the target campaign is searched in step 608 and if a response is found in step 610, the response is sent in step 612. If a response is not found to a web retailer's target campaign the process continues to look at target campaign's no response settings previously setup through the TSA management console and save it, step 626, for future use. If a default campaign exists, step 628, the default campaign is searched in step 630 and if the response is found in step 632 the response is sent in step 612. However if no response is found in step 632 or if a default campaign is not setup in step 628, the previously saved no response from step 626 is sent in step 612. The no response found setting in one embodiment causes the chatbot to ask a clarifying question such as "please rephrase your question".

In the case where the target campaign is not used in step 606, the process flows direct to search the hierarchy in step 618 as shown. An example of a hierarchy of campaigns is a retailer site having a holiday special, then there is holiday terminology in the sales pitch or greeting or both, such as "Happy Holidays" or "We are running a special for Christmas!". There may also be a winter campaign and a default campaign. Each campaign may offer, for example different discounts, different delivery options and more. A target campaign is said to have precedence depending on when it is active. In this case the campaign may take precedence from November 1st through December 24th. This precedence-in-time creates a hierarchy. If the holiday special campaign would answer any questions first from a user and if no answer is found the system looks to other campaigns including the default campaign. This date based hierarchy searched campaigns based on each campaigns start date; the campaign with the earliest start date is searched first. In the event a response is found in step 620, this is sent in step 612. However, in the event that no response is found, in step 620, the "no response" from the first campaign is set and a no response set in step 624 is sent in send response step 612. Although a date precedence hierarchy has been shown, other hierarchies such as sequence numbers have been shown to work advantageously within the true scope and spirit of the present invention.

Campaign Setup and Management

A user name and password is assigned. Web retailer can access the TSA management console through the www.team-salesagent.com website. To login, click "Partner Login" and enter web retailer's username and password.

Selecting Sites

Figures 7, 8:
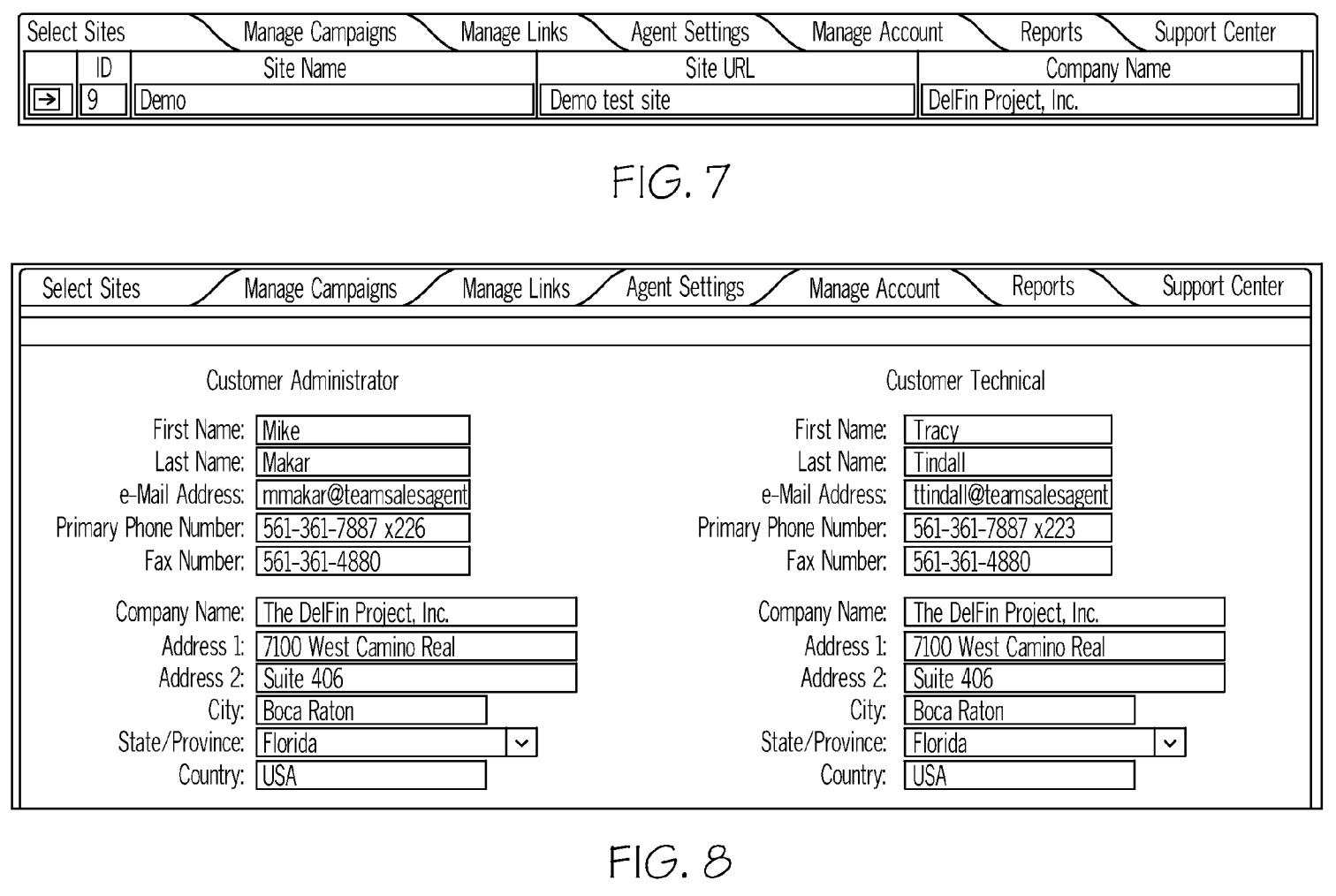

FIG. 7 is an example initial screen of the TSA management console, once the web retailer is logged-in, according to the present invention. Once logged in, the initial screen will provide easy access to all sites associated with web retailer's login.

(Note: Some navigation tabs are site specific and will be grayed out until a site is selected.) Choose the individual site by clicking the site arrow . This will display both active and inactive campaigns for the chosen site.

Manage Account—Contact and Company Information Setup

FIG. 8 is an example screen of the TSA management console for setting up the contact and company information, according to the present invention. Begin by selecting the "Manage Account" tab. Next enter web retailer's contact and company information. Click the "Update" button in the lower left corner of the screen to complete. This information can be changed anytime by entering new information in the fields and then clicking the "Update" button.

Agent Settings—Configuring the Chat Window

Figure 9:
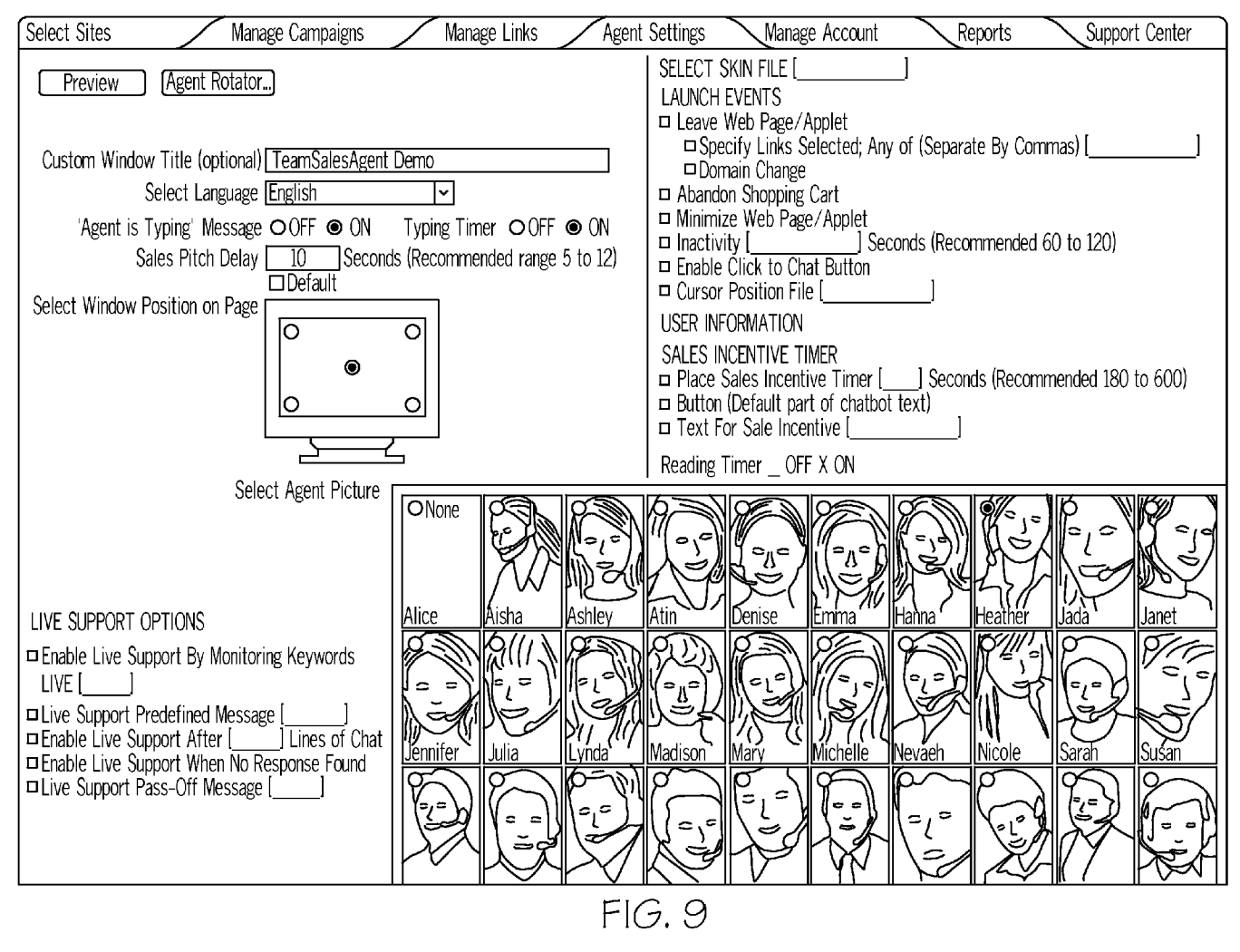

FIG. 9 is an example screen of the TSA management console for agent settings when configuring the chat window, according to the present invention. Options include branding, language selection, agent photo selection, agent message indicators, several timers and chat window positioning on web retailer's page. Begin by selecting the "Agent Settings" tab.

Custom Window Title—Web retailer can brand the chat box with web retailer's site name if desired by entering the name in the blank box. If web retailer prefers the chat box title bar will remain blank by leaving the field blank.

Select Skin—Web retailer can specify a skin definitions file or select from various default skin files.

Enable Passing Off to Live Person—Web retailer can enable whether certain keywords such as "supervisor" or "more information" or "manager" are in a file, such as a comma separated file. In this case, a predefined message such as "One moment please while I connect you with the correct department to assist you.". In another embodiment, a sub-menu of enabling passing off to a live person is to set a number lines of chat. The number of lines of chat is the number interactions between user and TSA. In the event the number of lines of chat are exceeded, the dialogue is seamlessly and automatically passed to a live agent. This helps to avoid the situation where the user begins doubting that the chatbot is a live person. In another submenu, a "No Response" event is enabled. In this embodiment, the agent cannot or has low probability in matching any of keywords typed by the user. The chatbot puts up a predefined message, such as "Sorry I don't understand let me pass you to my supervisor". In this case it wouldn't necessarily trigger off keywords like "supervisor".

Launch Events—Web retailer can enable certain predefined events for launching such as user leaving a web page/applet, selecting a certain link, leaving a domain, abandoning a shopping cart, minimizing web page/applet, inactivity for a period of time using an inactivity timer, selecting a link, coordinates of a cursor position on applet/webpage. Accordingly, the launching of the chatbot is based on one or more even/response pair triggers.

Sales Incentive Timer—Web retailer can enable a countdown timer be placed on the chatbox window or dynamically as part of the chatbox script. Sales incentives are good for a certain period of time e.g. "Free shipping for all orders placed in next five minutes" or "take an extra 10% off when ordering this item in the next hour". A button selection made by web retailer determines whether this text is part of the chatbot window or part of the chatbot text. One or more text strings for the chatbot is inserted by retailer.

Select Language—Web retailer can select from the drop-down any language web retailer would like the agent to converse in. The artificial intelligence engine is capable of optimizing many languages that the web retailer can select.

"Agent Is Typing" Message—Displays a message in the chat window to the customer that indicates the agent is typing a response. Typically this is set to be ON.

Typing Timer—This timer adjusts the agent's responses to a natural typing speed. Typically this is set to be ON.

Reading Timer—This timer creates a natural pause before the agent responds after web retailer's customer has entered information or a question so it appears the customer's question is being read by the agent. Typically this is set to be ON.

Sales Pitch Delay—This is the adjustable delay between the agent outputting each sales pitch entry.

Select Agent Picture—Select an agent to best match web retailer's site demographics or select "None" for a chat window with no picture. By prior arrangement, TSA can display web retailer's custom agent photo or web retailer's company's logo. Agent picture selection can have a dramatic effect on campaign performance. The web retailer should try several photos and review the reports to optimize results.

In one embodiment of the present invention, the agent name is directly associated with the picture. In another embodiment of the present invention, drop down allows web retailer to select a name for web retailer's agent.

The Preview Button in upper left allows the web retailer to preview the chat box as the web retailer has just configured it. It also allows the web retailer's configured chat with retailer's preferences to test previously loaded Keyword/Response Pairs. The web retailer completes the changes by clicking the "Update" button in the lower left corner of the screen.

Agent Rotator

Figure 10:
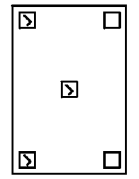
FIG. 10 is an example screen of the TSA management console for agent rotation settings, according to the present invention.

FIG. 10 is an example screen of the TSA management console for agent rotation settings, according to the present invention. To begin click the "Agent Rotator" button at the top left of the page, this will spawn a separate window. This powerful feature lets the agent retailer optimize the agent photos and screen locations of the chat window live on the web retailers site.

In the first available field the web retailer enters a percentage for the probability to have the agent photos and locations rotate. For example, if the web retailer chooses 40% this means the web retailers primary agent photo and location will appear in 40% of the launches, while the remainder of the launches will rotate photos and locations based on the web retailers selections on this page. Results of the agent rotation can be viewed and analyzed in the Reports section under the reports titled "Agent Photo Performance". Once the data is available, the web retailer can choose to eliminate agents and locations that are under-performing.

Select a mix of screen locations and agents and then click the update button on the bottom left of the page and the rotation and optimization of agents will begin on the web retailer's website immediately.

This feature can be used on a regular basis to provide optimum results for the web retailers site.

Window Position on Page—Move the selection button to locate the position the chat window will appear on the customer's browser. In one embodiment, the left upper corner or center provided optimum results. Although this has been optimized for languages with Latin origins, for other national languages this location may be different.

Manage Links

Figure 11:
FIG. 11 is an example screen of the TSA management console for managing links, according to the present invention.

FIG. 11 is an example screen of the TSA management console for managing links, according to the present invention. Links to different areas, pages and documents on web retailer's site are entered so the agent when asked by web retailer's customer can direct the customer to the appropriate information. One of the most important links to create is a link directing the abandoned customer back to the order page, shopping cart or registration page. All links should contain affiliate IDs to provide tracking and credit to the TSA system.

Additional links to consider including are: Privacy Policy, Shipping Information, FAQs, Contact Information, Contest Rules, Return Policy, Refer a Friend, if you like "that" then you might like "this", and more.

Links will be inserted into TSA Responses as they these responses are built in the Manage Campaigns section. As an example of a link being used, TSA may respond with "This is a limited time offer to take advantage now click here".

Adding and Canceling Links

Figure 12:
FIG. 12 is an example screen of the TSA management console for adding, according to the present invention.

FIG. 12 is an example screen of the TSA management console for adding and cancelling links, according to the present invention. To add a link just click the "Add Link" button and the above dialogue box will appear. The web retailer may also cancel an existing link by clicking the Cancel icon  to the left of the link.

Link Name

This is an internal name, only visible to retailer, to help identify the link when the web retailer built agent responses. For a naming example, if the link goes to a Privacy Policy, it should probably be titled "Privacy".

Default Text

This is a text line that will appear in the chat window and be seen by the web retailers customer to help guide them. For example, a link back to a registration page might be entered to display as "click here".

URL

This the complete URL of the destination page including the affiliate ID.

When entries are complete the web retailer must confirm by clicking the "OK" button.

Editing Links

Figures 13, 14:
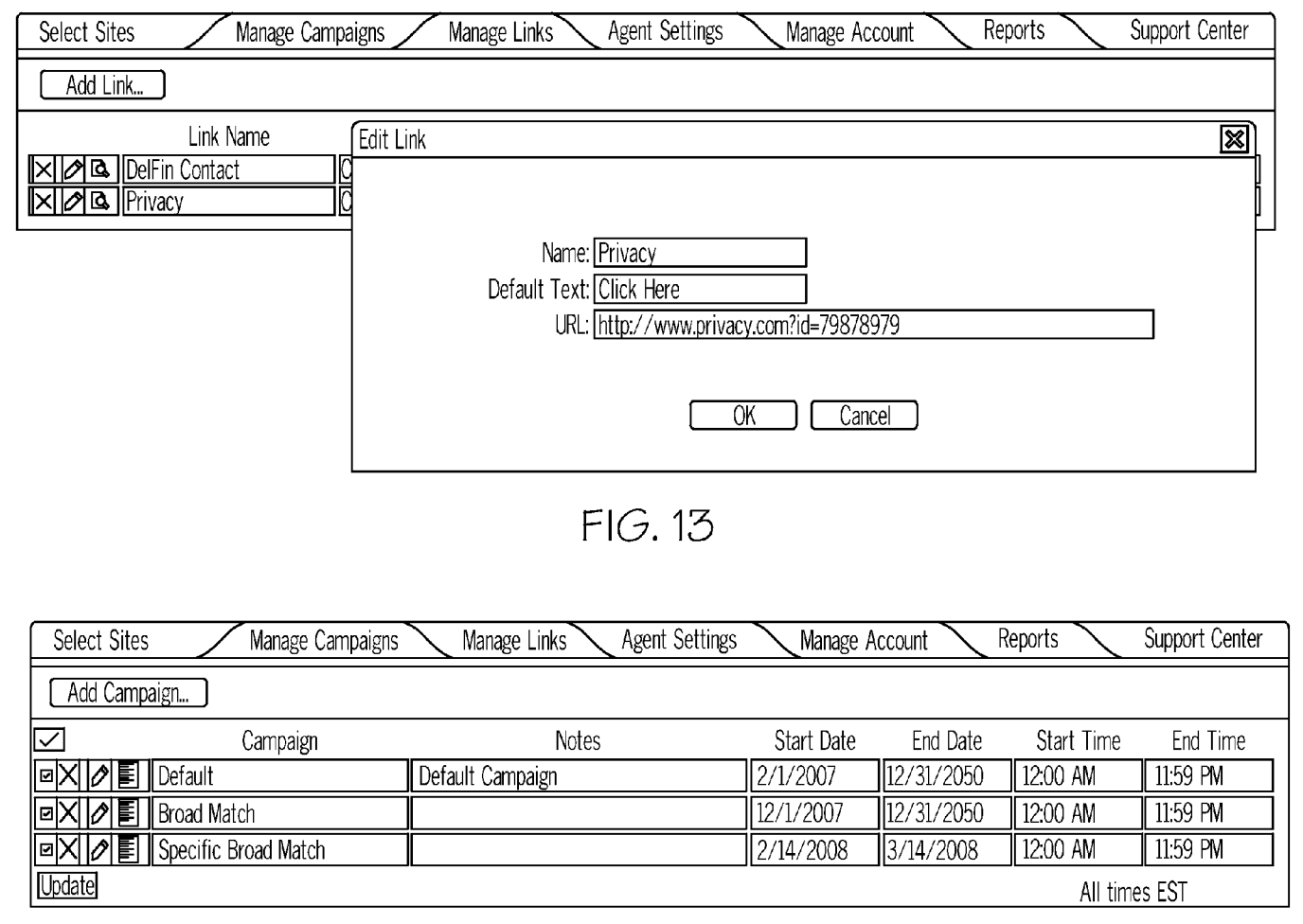

FIG. 13 is an example screen of the TSA management console for editing links, according to the present invention. To edit an existing link just click the Edit icon to the left of the link and the above dialogue box will appear. The web retailer can modify information in any field.

Link Name

As described above, this is an internal name, only visible to the web retailer, to help identify the link when building agent responses. The web retailer can modify the information in the field by just typing in new information.

Default Text

This is a text line that will appear in the chat window and be seen by a customer/user of the web retailers website to help guide them. The web retailer can modify the information in the field by just typing in new information.

URL

This the URL of the destination page which includes the affiliate code. The web retailer can modify the information in the field by just typing in new information.

When edits are completed the web retailer must confirm by clicking the "OK" button.

Manage Campaigns

FIG. 14 is an example screen of the TSA management console for managing campaigns, according to the present invention. TSA can support multiple campaigns. Creating and editing a campaign is simple. To add a new campaign, click the "Add Campaign" button. To edit an existing campaign click the Edit icon to the left of the campaign name. The web retailer may also cancel a campaign by clicking the Cancel icon.

The Keywords icon will give the web retailer access to keyword/response and event/response pairs.

TSA can support multiple campaigns. At least one campaign, titled "Default" must be present and active for any chat session to launch. Campaigns may be made active or inactive using the check boxes located at the left side of the window. They will also become active or inactive depending on the campaign start and end dates. TSA will always establish a Global campaign, which handles responses to most undesirable and improper language.

Multiple campaigns can be supported on a single site. If multiple campaigns are used then the start date of the campaign determines the priority of the response selection. For example, if a default campaign is created with a start date of 01/01/20xx and a second campaign is created, the second campaign start date must occur after the default campaign. As described above, other types of filtering including sequence numbers can be used to manage multiple campaigns.

Add, Edit or Cancel Campaign

Figure 15:
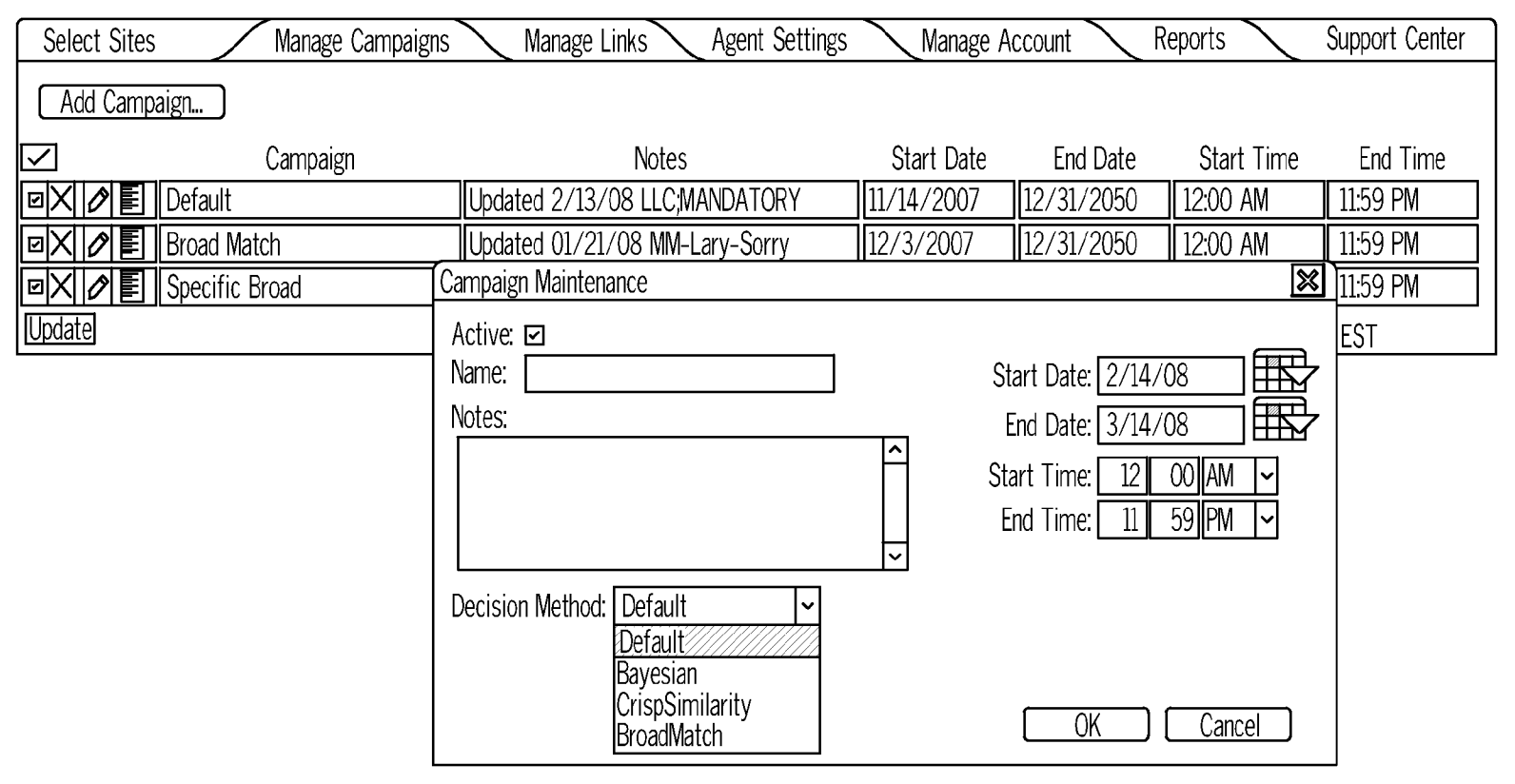

FIG. 15 is an example screen of the TSA management console for adding, editing or cancelling campaigns, according to the present invention. To initiate the web retailers site-specific campaigns, click the "Add Campaign" button and the dialog box shown above is launched.

Campaign Name

Enter a new campaign name or modify an existing campaign name.

Notes

Enter any new specific campaign notes or modify existing notes.

Decision Method

The web retailer selects one of three campaign decision methods for each campaign. The questions entered by users will be evaluated by the selected decision method and the appropriate response is then given by the agent. The Artificial Intelligence engine matches the user's question with the campaigns' keyword sets. Each keyword set is assigned a matching score according to the campaign matching method. There are currently three User Questions to Keyword set matching methods: Bayesian probability, Crisp Similarity, and Broad Match. See Sections below entitled Show Events, Show Keywords and Reports for a further description of Decision Methods.

Start and End—Date and Time

Enter the dates and hours of the day the campaign will be active. The start dates are important as they imply the order in which the campaigns are applied. To confirm the changes the web retailer must click the "OK" button.

Show Events

Figure 16:
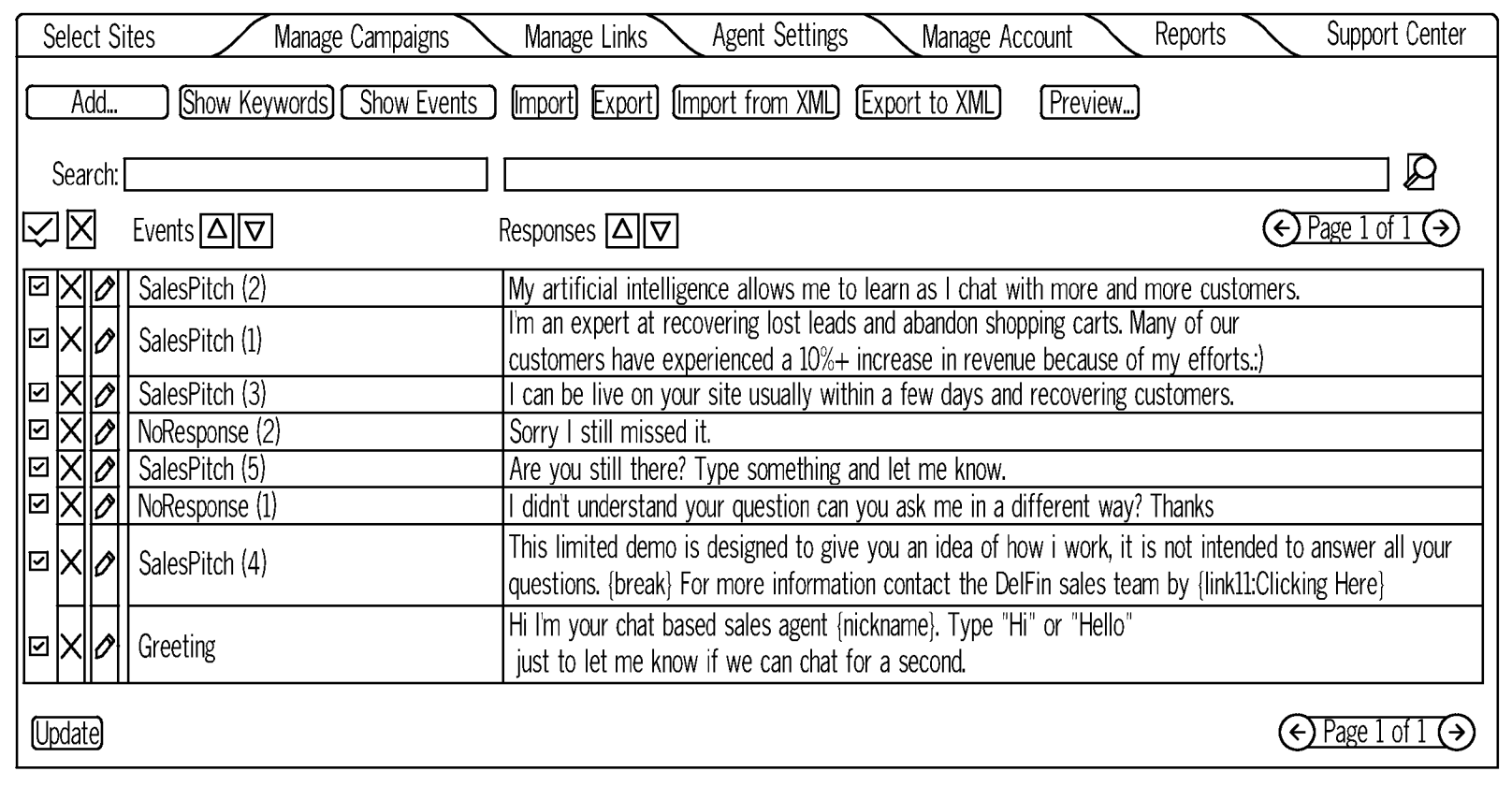

FIG. 16 is an example screen of the TSA management console for showing events, according to the present invention. Under the Manage Campaigns section, click the keyword icon for the campaign web retailer to edit and then the "Show Events" button. Data can be entered in either of two ways, directly entered through the TSA management console as shown below or imported through an uploaded spreadsheet such as the format supported by Microsoft Excel. All adds, changes, etc. may be required to go through a review and approval cycle by TSA prior to release to an active TSA site. Data can be exported to a spreadsheet at any time. Web retailer creates responses for three basic events. Prior to creating Events the web retailer should refer to the Tips and Tricks section of this guide for useful information.

Greeting

The Greeting will display when a customer initially abandons web retailer's shopping cart or registration and the agent is launched. The greeting should get their attention and attempt to engage web retailer's customer in chat with the agent. The old adage "Once a web retailer can get a user talking, then the web retailer increases his/her chance to make a sale" is very true. For example, a greeting could respond "Hi, don't go we have a fantastic offer for web retailer".

Sales Pitch

When TSA first delivers the greeting to web retailer's customer it will wait for the customer to respond and engage the agent. If the customer does not engage, a Sales Pitch will be launched (if present) in an attempt to win the business back. TSA supports multiple Sales Pitch entries and these will be shown in sequence to the customer. In one embodiment three sales pitch entries are added to web retailer's campaign.

No Response

TSA will launch this if is unable to select a good match to web retailer's customer's question or query. Using the No Response event, TSA can ask the customer to rephrase the question.

The web retailer can delete an entry by clicking the cancel icon or edit by clicking edit icon. To add an entry, begin by clicking the "Add" button. The web retailer can search for specific keywords or responses using the search box. In addition, keyword/responses can be sorted alphabetically by using the up-down arrows.

Add or Edit Events.

Figure 17:
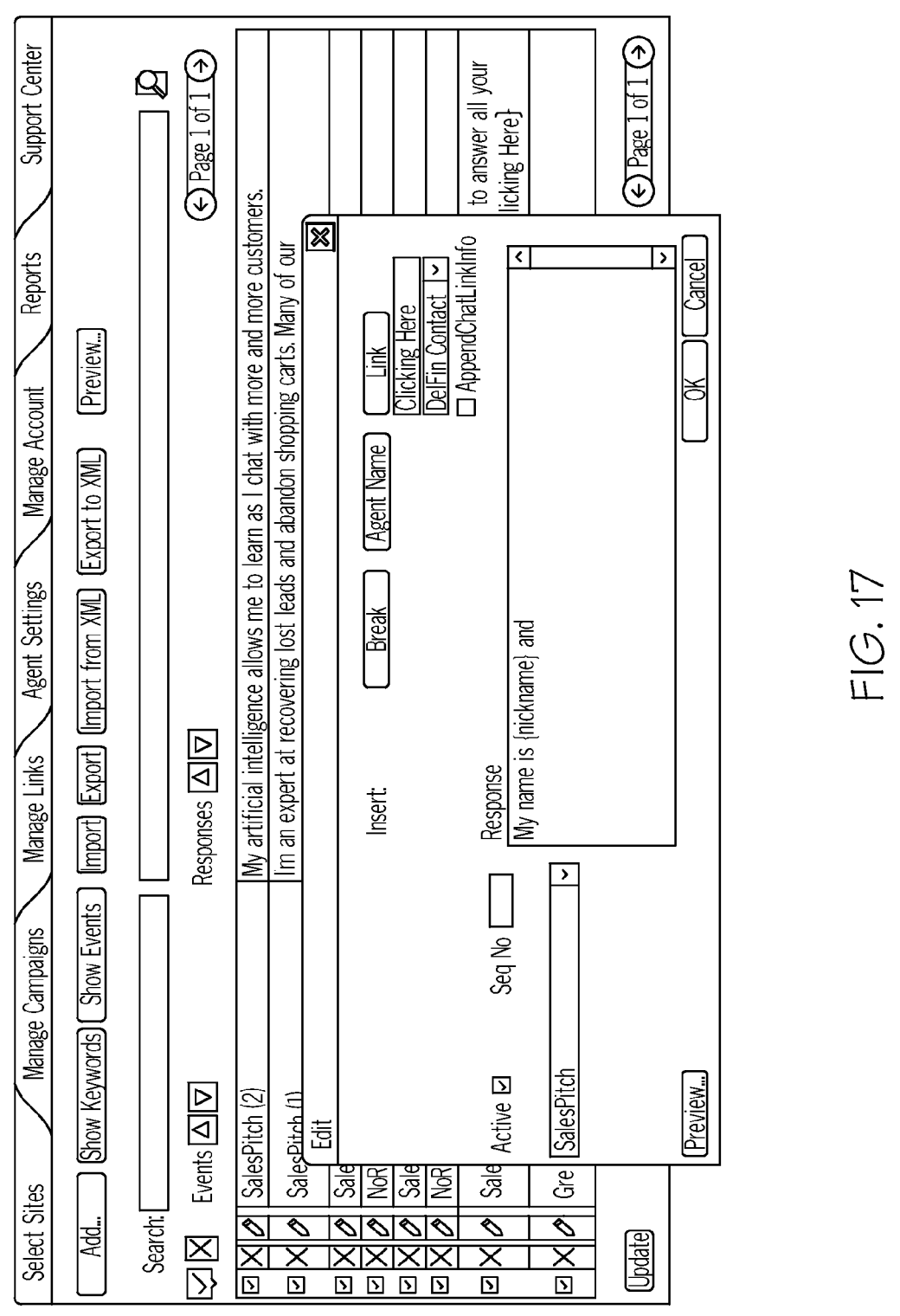

FIG. 17 is an example screen of the TSA management console for adding or editing, according to the present invention. The web retailer usually adds at least one greeting. Two or more greetings are launched alternately. Three or more different sales pitches and at least one no response event is recommended.

Select the event type (greeting, no response or sales pitch) from the drop down menu. Enter the agent response text in the large text area to the right. The web retailer may include a previously entered link in the agent dialogue. The web retailer can preview the agent by clicking the preview button in the lower left corner. The web retailer clicks "OK" to confirm. The web retailer repeats this process for the greeting, no response and sales pitch. TSA can support multiple entries of each type, as desired.

When changes and/or additions are complete, the web retailer may be required to click the "Update" button in the lower right corner of the screen to confirm changes. The "Update" button will be activated if the web retailer has activated/deactivated any event. The web retailer can activate/deactivate an event by using the checkbox to the left of each event.

Show Keywords

FIG. 18 is an example screen of the TSA management console showing keywords, according to the present invention. Click the "Show Keywords" button under the Manage Campaigns tab to display the specific campaign's keyword/response list.

Keyword/Response pairs need to be created to allow TSA a beginning base of responses to customer questions. As TSA engages more customers its artificial intelligence engine will help refine the responses but initially some basic responses to questions or comments by customers need to be loaded.

Data can be directly entered through the TSA management console or imported through an uploaded spreadsheet. All adds, changes, etc. may be required to go through a review and approval cycle by TSA prior to release to an active TSA site. Data can be exported to a spreadsheet at any time.

After all changes are complete, web retailer must click the "Update" button on the lower left part of the screen to confirm the changes. Web retailer can disable a keyword by using the checkbox to the left of each keyword.

Add, Edit or Cancel Keywords

Figure 19:
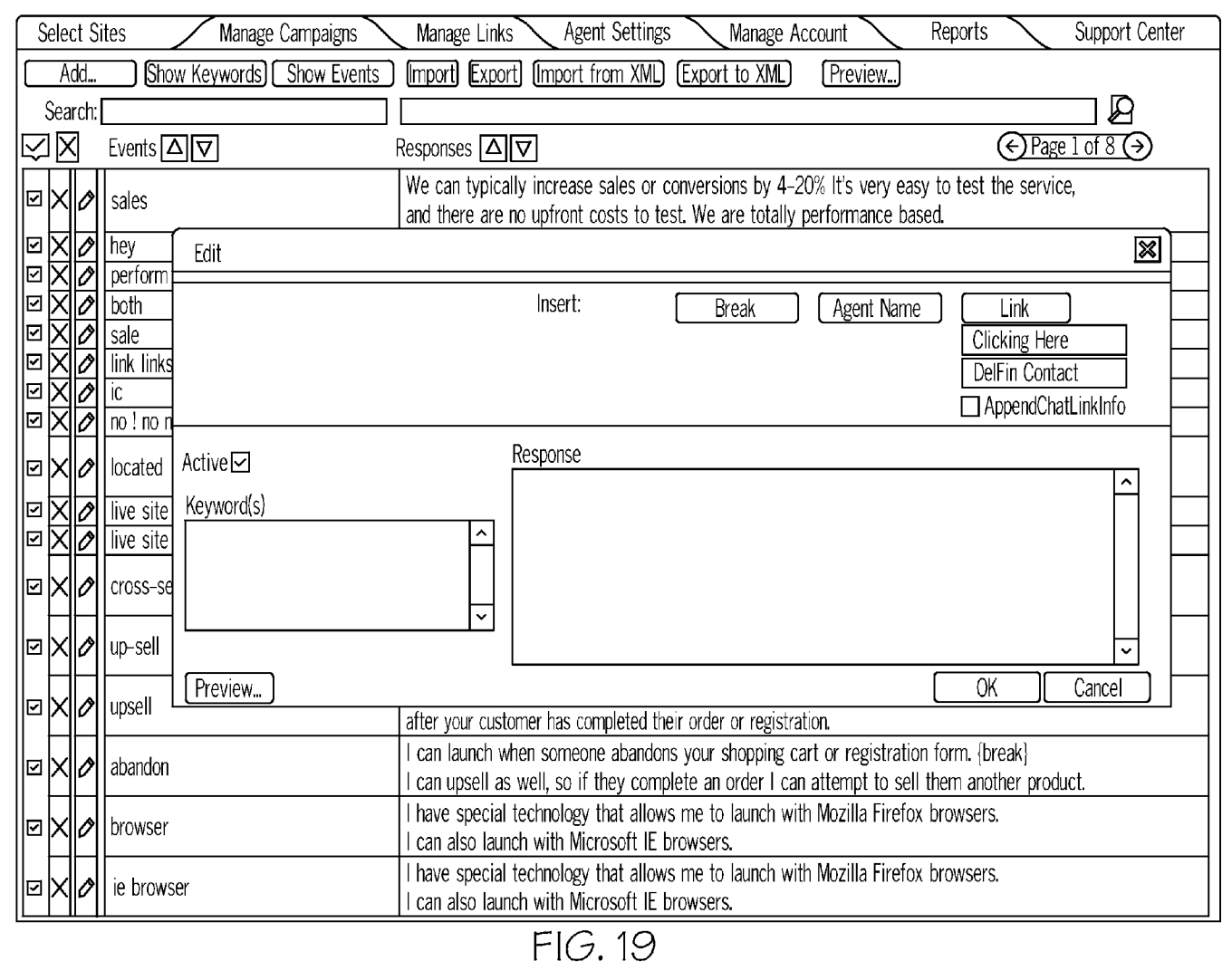

FIG. 19 is an example screen of the TSA management console for adding, editing or canceling keywords, according to the present invention. To add an entry, begin by clicking the "Add" button and the screen shown above will appear.

In creating Keyword/Responses choose keywords that would be part of normal conversation between TSA and web retailer's customer. For example, a customer might inquire "How much does it cost?" Web retailer would then enter the keyword "cost" in the left box with the appropriate agent response entered in the box on the right. Each response can include several optional features. The first option is "Break" which can be inserted by clicking the button and creates a natural break or pause between sentences that the agent is typing. Web retailer can also insert the agent's name in the sentence by clicking the "Agent Name" button at the appropriate spot in the sentence. The final option is the addition of a link (previously created in Manage Links section) which can be inserted in a TSA response sentence to redirect the customer back to the registration page or shopping cart. Links can also be inserted to redirect the customer to privacy policies, contact information and FAQs if desired. Optionally the "AppendChatLinkInfo" check box can be selected to dynamically append a publisher defined value to the link. The value is assigned via JavaScript code during the site integration and can be used to pass a session identifier, product code, shopping cart identifier or other useful value. To confirm web retailer's changes web retailer must click the "OK" button.

Reports

Figure 20:
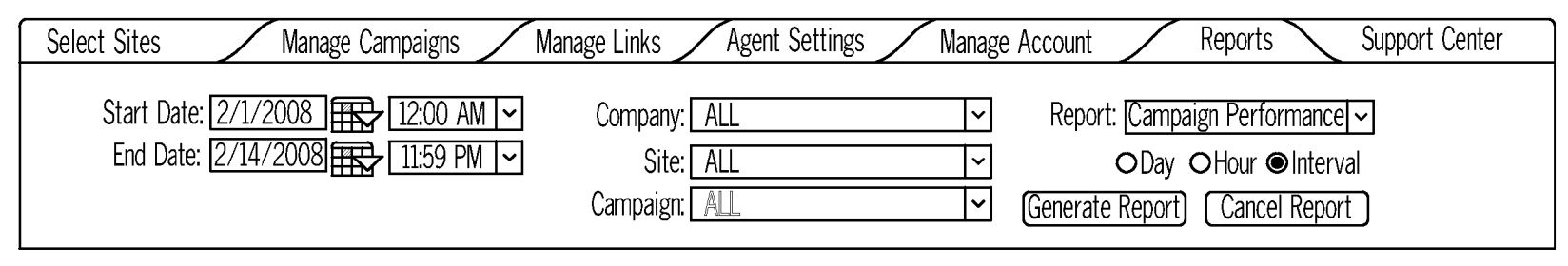

FIG. 20 is an example screen of the TSA management console for viewing reports, according to the present invention. All reports can be viewed online, printed or exported to a spreadsheet. First select the Start and End Dates, then Select the Site and Campaign. Note the Default for Site and Campaign is "All". A few of the example reports are described below:

Campaign Performance Report

FIG. 21 is an example screen of the TSA management console for viewing campaign performance reports, according to the present invention. This report tracks the number of TSA launches, customer engagements, customer clicks, & conversions. Percentages are also provided for convenience.

User Questions Report

FIG. 22 is an example screen of the TSA management console for viewing user questions reports, according to the present invention. This report provides a dissected list of user chats aligned by keyword triggers for any period. Agent responses to keywords along with frequency counts are also provided.

User Response Report

FIG. 23 is an example screen of the TSA management console for viewing user response reports, according to the present invention. This report delivers a list of customer responses triggered by the agent responses.

Keywords Report

FIG. 24 is an example screen of the TSA management console for viewing keyword reports, according to the present invention. This report provides a list the keywords triggered by customers. It is sorted by frequency.

Unrecognized Questions Report

FIG. 25 is an example screen of the TSA management console for viewing unrecognized question reports, according to the present invention. This report lists questions asked by customers in which there was no direct matching response by TSA. This data will help create more relevant answers to customer questions. It should be noted that when the agent does not recognize a question it continues to engage the customer through a "No Response Event".

Link Clicks by Response Report

FIG. 26 is an example screen of the TSA management console for viewing link clicks by response reports, according to the present invention. This report lists the links that were clicked by customers most frequently after TSA displayed a response.

Greeting Performance Report

FIG. 27 is an example screen of the TSA management console for viewing greeting performance reports, according to the present invention. This report tracks the number of TSA launches, customer engagements, customer clicks, and conversions by Greeting.

Agent Photo Performance

FIG. 28 is an example screen of the TSA management console for viewing agent photo performance reports, according to the present invention. This artificial intelligence based report delivers performance statistics for agent being rotated on the web retailers website. In addition, the web retailer can drill down to find the optimum screen location for each agent by clicking the plus sign next to each agent.

Agent Location Performance

FIG. 29 is an example screen of the TSA management console for viewing agent location performance reports, according to the present invention. This artificial intelligence based report delivers performance statistics by screen location.

Artificial Intelligence Decision Methods

How the Artificial Intelligence (AI) Engine Works

TSA's artificial intelligence engine is implemented as a multilayer neural network. This patent pending technology can handle a wide spectrum of the chat applications. It is used to parse, analyze and optimize agent responses to customers resulting in the highest level of conversion.

Depending on the chat application requirements and on the campaign's learning stage, the artificial intelligence engine shifts from using rigid similarity measures and morphs into an evidence based probabilistic network.

As an example, let's say our FIRST customer on a newly TSA-enabled website asks "How much is the shipping cost?" On this first day of the campaign, the AI engine begins with two EQUALLY WEIGHED keyword sets, "how much" and "shipping cost". Each has a different response. The other words in the customer question "is" and "the" are weighted as well. Over time the often used words like "is and "the" will be less influential. The AI engine will analyze the agent's responses and determine which specific responses produce the most customer conversions. Going forward it will continually optimize the list of responses to the customer. While the AI engine will select the agent response that produces the best results, it will not generate new responses unless trained by a live agent or maintained by campaign administrator.

Examples of AI technology that have been shown to be used advantageously with the present invention are disclosed in U.S. patent application Ser. No. 11/020,542, with inventors Gene I. KOFMAN et al., filed on Dec. 22, 2004 entitled "AUTOMATIC CREATION OF NEURO-FUZZY EXPERT SYSTEM FROM ONLINE ANALYTICAL PROCESSING (OLAP) TOOLS" which is hereby incorporated by reference in its entirety.

In one embodiment, AI technology is used to purposely populate response with typos, slang and other vernacular to make the chatbox appear more like a human. The responses although grammatically correct for a question are altered just before being presented to the user by purposely substituting misspellings, typos, slang and synonyms in the responses based on the analysis of user input and management console settings.

Bayesian

The Bayesian method first evaluates the number of common (triggered) words between the User's question and the keyword sets. The more triggered words the higher the keyword set's score. It then considers the total number of words in the keyword set and user's question. A high word count in the user's question or the keyword set lowers total score.

The keyword set with highest score wins and its response is displayed by the agent. The score has to be greater than the NoResponse threshold for the keyword set's response to be selected.

Crisp Similarity

Evaluates the number of common (triggered) words between the user question and the keyword set. Higher number of common words increases the score. It also evaluates the total number of words in the keyword set and user question. Higher number lowers total score.

The keyword set with highest score wins and its response is displayed by the agent. The score has to be greater than the NoResponse threshold for the keyword set's response to be selected.

Broad Match.

All words in keyword set have to be present in user's question to trigger an agent response. This method is similar to PPC search marketing keyword matching.

Agent Selection Settings

Timers

In general all timer defaults should be set. The TSA system creates an illusion of a live operator and so natural speed reading and typing timers are a key element. There maybe some situations where a faster or slower response is desired. Timer values used in this patent are suggestions only. The web retailer adjusts each timer until they have optimized the agent on their web site.

Agent Photos and Screen Locations

The web retailer in one embodiment should match agent photos to their web user demographics. Consider age, race and sex when selecting agents. Experiment with the Agent Rotator feature to find the optimum combination of agent and window location. Make sure to first establish a baseline to measure changes.

Creating and Optimizing Agent Keywords/Responses

General

A strong Sales Pitch with incentives should be used if possible. Start with a Campaign greeting and use it as a "hook". Keep sentences short and simple again to maintain the illusion of chat based support and sales. Avoid short paragraphs as responses. As often as practical include a hyperlink back to the site.

Misspellings, Expressions and IM Abbreviations

The web retailer may include common expressions and misspells and other dialects and slang into one Keywords set. For example, include "hi, hello, wasup, what's up, whatsup, watsup, hey, wassup, hola, ola" into one set of Keywords, unless the web retailer wants some of these greetings to trigger a different Response.

Creating and Optimizing Events

Creating and Optimizing Keywords/Responses

General

Keep responses short. If the agent responds with long sentences most customers will take the easy way out and ignore them. Make them short and to the point.

Use the report tools to help optimize web retailer's campaign. The Unrecognized Questions Report is invaluable. Scan it often to see what web retailer's customers are not getting the right answers to. Web retailer can easily formulate good keyword/responses based on the most active unrecognized questions. Check the Keywords Report to determine the frequency of engagement of each of web retailer's keywords. Use these reports to help optimize.

The Main Objective—Back to the Cart!

Remember web retailer's agent is here to answer customer questions and give the customer a positive experience but the key objective is to guide them back to the registration page or shopping cart they abandoned. Web retailer are not trying to test how long web retailer can keep a customer engaged in conversation with the agent but instead how many will be saved and counted as conversions. Liberally sprinkle web retailer's responses with click-back opportunities to return them to the abandon page. If the customer asks "Do I need a credit card to register?" have web retailer's agent respond "Web retailer doesn't need a credit card to register just CLICK HERE and complete the survey".

Circle Back Approach to Keywords and Responses

An easy first approach to Keyword/Response creation is to include the customer's keyword in the agent's response. It is best to keep the agent responses general at first until the artificial Intelligence has seen enough traffic and can refine the best response for a specific keyword.

For example, the customer may ask "How much does shipping cost?". The keywords would mostly likely be loaded as "shipping cost" and a generalized answer from the agent might be "We offer ground and overnight shipping at very inexpensive rates. CLICK HERE to view our shipping charges".

Another example might have the customer asking "Does web retailer accept American Express?" Web retailer would load the Keyword as "American Express". The agent's response, again being general could be "We accept American Express, Master Card and Visa". Web retailer could additionally create keywords for "Visa" and "Mastercard" and cutand-paste the same response. The same response could also be used for the keyword "credit card" or "payment options" and so on.

Misspellings, Common Expressions and IM Abbreviations

Don't forget to include misspellings and common expressions and IM abbreviations in both web retailer's keywords and agent responses. If a customer sends a J web retailer can load "J" as a keyword and have the agent respond with a "J". Web retailer may include common expressions and misspells into one Keyword set. For example, include "hi, hello, wasup, what's up, whatsup, watsup, hey, wassup, hola, ola" into one set of Keywords, unless web retailer wants some of these greetings to trigger a different response.

Sales Pitch

The Sales Pitch launches when there is a pause in communications with the agent. If a customer stops engaging the agent, the Sales Pitch will be launched after a pre-set amount of seconds. This is web retailer's second-second chance to recover the customer. Keep the message short but clear—remember web retailer wants them to return to the registration page or cart. Offer incentives like free shipping or a coupon if they return. Web retailer can create multiple Sales Pitches and measure success and refine them. Don't be afraid to experiment. This is an opportunity to be creative with different methods.

Typical Implementation Sequence and Optimization

This represents a typical TSA implementation sequence. It is important to remember that every website and TSA application is unique so there may be some variance. Typically with the cooperation of the publisher this will take a few days.

The web retailer will receive a secure login and password. The web retailer identifies the site(s) and page(s) on which the web retailer wishes to enable TSA. TSA can spider on sites/pages and create a single line of code, which is pasted on the web retailers website. TSA in one embodiment uses some type of tracking through the link presented by the agent—an affiliate ID works best so credit for any sales recovered by the TSA system including up-sales or cross-sales. The web retailer determines the type of campaigns they will run, i.e. recovery, cross-sell, etc. The initial campaigns (agent responses) are created and configured by the initial agent and screen location. Any information shared by the web retailer on user demographics, traffic sources, frequently asked questions, etc. will help set the initial campaigns to get best results. The web retailer will be then asked to review the initial campaigns, change or delete any responses, etc. The system is then tested and launched.

Optimization Cycle

Once the web retailer's agent is active the optimization begins. This process normally takes 2-3 weeks. Again, this is a typical time-frame; however all websites are unique and other shorter or longer time frames may be necessary.

1st week—focus on filling in all the agent responses based on user questions not anticipated. The objective is to answer 90%+ of the user questions by end of the first week.

2nd week—focus on agent photo/name, screen location, etc. to get optimum configuration.

3rd week—begin to analyze the greeting, agent responses for the ones that stimulate the most clicks.

The process is on-going from here.

Sample Website Integration Instructions

The following are examples of script used to integrate TSA system into a web retailer's website.

1. Add the following JavaScript code just before the </head> tag on the page(s) web retailer want the chat window to launch:

```
<script language="javascript"
src="http://chat.teamsalesagent.com/tsa/JS/chat_X.aspx">
</script>
```

For secure server pages use:

```
<script language="javascript"
src="https://chat.teamsalesagent.com/tsa/JS/chat_X.aspx">
</script>
```

Note:
TSA will assign a site specific value to replace "X" in the above example.

2. Add the following JavaScript code near the top of the head section to assign our variable SymRealWinOpen to window.open before it is redefined by anything else:

```
< script language="javascript">
<!--
SymRealWinOpen=window.open;
//-->
</ script>
```

3. For any link on the page that web retailer want users to be able to click without opening the chat window, add onclick="nolaunchClick=true;" Note: This is only necessary for links that open in the same window. For instance, if web retailer has the following link:
<a href="http://www.web retailer'ssite.com/faq.html">
Add the onclick tag,

```
<a href="http://www.web retailer'ssite.com/faq.html"
onclick="nolaunchClick=true;">
```

Same for submit buttons on forms:
   <input type="submit" name="submit">
Becomes,
   <input type="submit" name="submit" onclick="nolaunchClick=true;">

4. To launch the chat window when a link is clicked, use onclick="nolaunchClick=true; return showChat( )"

In this case nolaunchClick=true will switch off opening of the chat window by the page closing events. Instead, showChat( ) will execute SymRealWinOpen to open the chat window through the window.open function.

Note: Using showChat( ) instead of page closing events is more of a special implementation for demos and such.

5. Include the following code on the TeamSalesAgent affiliate confirmation page so conversion data will appear in the Campaign Performance report:

```
<img src="http://chat.teamsalesagent.com/tsa/pixel.aspx?siteid=12"
width="1" height="1" border="0" alt="" />
```

6. The ChatLinkInfo variable is provided to allow passing session specific variables to the links in the TeamSalesAgent chat window. This permits the chat window links to maintain the user's original affiliate, session, shopping cart ID or any other value of interest. The basic syntax it:

```
<script language=javascript type=text/javascript>
<!--
var ChatLinkInfo="OriginalAffiliateID=1234&ProductCode=567890";
// -->
</script>
```

The value can be set anywhere on the page and can be updated. The value passed to the link will be the value in effect when the TSA chat window is launched.

NON-LIMITING EXAMPLES

Even though a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A computer-implemented method for managing a conversational system on a server, the method comprising:
   presenting on a user system of a first party, each of
      at least one chatbot as part of at least one messaging window forming a chat window hosted by a third party, the chatbot adapted to act as a customer service agent for at least one of a good and a service; and
      a web page document hosted by a second party, the web page document including code to launch the chat window hosted by the third party, and the second party and the third party being independent business entities;
   displaying a message to the first party through the messaging window; and
   reviewing a response from the first party using a combination of keyword/response pair scripting and artificial intelligence; and
   wherein the keyword/response pair scripting, the messaging window and the artificial intelligence are all managed via a web-based management console hosted by the third party, the web-based management console includes components selectable by the second party for managing the messaging window of the chatbot, separate from a window of the web page document hosted by the second party for display on the user system of the first party, the components including at least one event to launch the messaging window of the chatbot in response to code scripting at the web page document hosted by the second party.

2. The method of claim 1, wherein the event to launch the chatbot includes leaving the web page.

3. The method of claim 1, wherein the web-based management console of the third party includes a management console for managing the messaging window of the chatbot, separate from the window of the web page document of the second party for display on the user system of the first party, the components selectable by the second party includes one or more of the following a sales incentive timer;
   a gender of the chatbot;
   a picture of the chatbot;
   a name for the chatbot;
   a persona presented to the first party; and
   a national language of the chatbot.

4. The method of claim 1, wherein the web-based management console of the third party includes a management console for managing the messaging window of the chatbot, separate from the window of the web page document of the second party for display on the user system of the first party, the components selectable by the second party includes a keyword/response pair for use by the chatbot and one or more of the following:
   a greeting;
   a reading timer;
   a skin of the messaging window;
   a typing timer;
   a skin of the chatbot messaging window; and
   a title on a window for the messaging window.

5. The method of claim 1, wherein the web-based management console of the third party includes a management console for managing the messaging window of the chatbot, separate from the window of the web page document of the second party for display on the user system of the first party, the components selectable by the second party includes a period of time when a messaging window of the chatbot is active.

6. The method of claim 4, further comprising:
   generating a report on activities of the chatbot.

7. The method of claim 6, wherein the report includes one or more of:
   keyword report;
   unrecognized question report;
   campaign performance report;
   link clicks by response report; and
   first party response report.

8. A computer program storage product for managing a conversational system on a server, the computer program storage product comprising:
   a non-transitory storage medium readable by a computer and storing instructions for execution by the computer for performing:
   presenting on a user system of a first party, each of
      at least one chatbot as part of at least one messaging window forming a chat window hosted by a third party, the chatbot adapted to act as a customer service agent for at least one of a good and a service; and
      a web page document hosted by a second party, the web page document including code to launch the chat window hosted by the third party, and the second party and the third party being independent business entities;
   displaying a message to the first party through the messaging window;
   reviewing a response from the first party using a combination of keyword/response pair scripting and artificial intelligence; and
   wherein the keyword/response pair scripting, the messaging window and the artificial intelligence are all managed via a web-based management console hosted by the third party, the web-based management console includes components selectable by the second party for managing the messaging window of the chatbot, separate from a window of the web page document hosted by the second party for display on the user system of the first party, the components including at least one event to launch the messaging window of the chatbot in response to code scripting at the web page document hosted by the second party.

9. The computer program storage product of claim 8, wherein the event to launch the chatbot includes one or more of the following leaving the web page.

10. The computer program storage product of claim 8, wherein the web-based management console of the third party includes a management console for managing the messaging window of the chatbot, separate from the window of the web page document of the second party for display on the user system of the first party, the components selectable by the second party includes one or more of the following:
- a sales incentive timer;
- a gender of the chatbot;
- a picture of the chatbot;
- a name for the chatbot;
- a persona presented to the first party; and
- a national language of the chatbot.

11. The computer program storage product of claim 8, wherein the web-based management console of the third party includes a management console for managing the messaging window of the chatbot, separate from the window of the web page document of the second party for display on the user system of the first party, the components selectable by the second party includes a keyword/response pair for use by the chatbot and one or more of the following a greeting;
- a reading timer;
- a skin of the messaging window;
- a typing timer;
- a skin of the chatbot messaging window; and
- a title on a window for the messaging window.

12. The computer program storage product of claim 8, wherein the web-based management console of the third party includes a management console for managing the messaging window of the chatbot, separate from the window of the web page document of the second party for display on the user system of the first party, the-components selectable by the second party includes a period of time when the messaging window of the chatbot is active.

13. The computer program storage product of claim 8, further comprising:
generating a report on activities of the chatbot.

14. The computer program storage product of claim 13, wherein the report includes one or more of:
- keyword report;
- unrecognized question report;
- campaign performance report;
- link clicks by response report; and
- first party response report.

15. A system for managing a conversation system, the system comprising:
- a computer coupled to a storage medium readable and storing instructions for execution by the system for performing
- presenting on a user system of a first party, each of
  - at least one chatbot as part of at least one messaging window forming a chat window hosted by a third party, the chatbot adapted to act as a customer service agent for at least one of a good and a service; and
  - a web page document hosted by a second party, the web page document including code to launch the chat window hosted by the third party, and the second party and the third party being independent business entities;
- displaying a message to the first party through the messaging window;
- reviewing a response from the first party using a combination of keyword/response pair scripting and artificial intelligence; and
- wherein the keyword/response pair scripting, the messaging window and the artificial intelligence are all managed via a web-based management console hosted by the third party, the web-based management console includes components selectable by the second party for managing the messaging window of the chatbot, separate from a window of the web page document hosted by the second party for display on the user system of the first party, the components including at least one event to launch the messaging window of the chatbot in response to code scripting at the web page document hosted by the second party.

16. The system of claim 15, wherein the event to launch the chatbot includes leaving the web page.

17. The system of claim 15, wherein the web-based management console of the third party includes a management console for managing the messaging window of the chatbot, separate from the window of the web page document of the second party for display on the computer of the first party, the components selectable by the second party includes one or more of the following a sales incentive timer;
- a gender of the chatbot;
- a picture of the chatbot;
- a name for the chatbot;
- a persona presented to the first party; and
- a national language of the chatbot.

18. The system of claim 15, wherein the web-based management console of the third party includes a management console for managing the messaging window of the chatbot, separate from the window of the web page document of the second party for display on the computer of the first party, the components selectable by the second party includes a keyword/response pair for use by the chatbot and one or more of the following:
- a greeting;
- a reading timer;
- a skin of the messaging window;
- a typing timer;
- a skin of the chatbot messaging window; and
- a title on a window for the messaging window.

19. The system of claim 15, wherein the web-based management console of the third party includes a management console for managing the messaging window of the chatbot, separate from the window of the web page document of the second party for display on the computer of the first party, the components selectable by the second party includes a period of time when messaging window of the chatbot is active.

20. The system of claim 15, further comprising:
generating a report on activities of the chatbot.

21. The method of claim 1, wherein the event to launch the chatbot includes selecting specific links.

22. The method of claim 1, wherein the event to launch the chatbot includes a change in domain.

23. The method of claim 1, wherein the event to launch the chatbot includes abandon shopping cart without leaving a domain.

24. The method of claim 1, wherein the event to launch the chatbot includes minimizing a web page.

25. The method of claim 1, wherein the event to launch the chatbot includes an inactivity timer expiring.

26. The method of claim 1, wherein the event to launch the chatbot includes a selection of click to chat button.

27. The method of claim 1, wherein the event to launch the chatbot includes a hover cursor position on the web page for a period of time.

28. The system of claim 15, wherein the event to launch the chatbot includes selecting specific links.

29. The system of claim 15, wherein the event to launch the chatbot includes a change in domain.

30. The system of claim 15, wherein the event to launch the chatbot includes abandon shopping cart without leaving a domain.

31. The system of claim 15, wherein the event to launch the chatbot includes minimizing a web page.

32. The system of claim 15, wherein the event to launch the chatbot includes an inactivity timer expiring.

33. The system of claim 15, wherein the event to launch the chatbot includes a selection of click to chat button.

34. The system of claim 15, wherein the event to launch the chatbot includes a hover cursor position on the web page for a period of time.

* * * * *